(12) United States Patent  
Yavari et al.

(10) Patent No.: US 12,093,614 B2
(45) Date of Patent: Sep. 17, 2024

(54) SIMULATING HEAT FLUX IN ADDITIVE MANUFACTURING

(71) Applicant: NUtech Ventures, Lincoln, NE (US)

(72) Inventors: Reza Yavari, Lincoln, NE (US); Prahalada Krishna Rao, Lincoln, NE (US); Kevin Cole, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 690 days.

(21) Appl. No.: 17/275,735

(22) PCT Filed: Sep. 13, 2019

(86) PCT No.: PCT/US2019/051192
§ 371 (c)(1),
(2) Date: Mar. 12, 2021

(87) PCT Pub. No.: WO2020/056388
PCT Pub. Date: Mar. 19, 2020

(65) Prior Publication Data
US 2022/0058315 A1 Feb. 24, 2022

Related U.S. Application Data

(60) Provisional application No. 62/730,876, filed on Sep. 13, 2018.

(51) Int. Cl.
*G06F 30/23* (2020.01)
*G06F 111/10* (2020.01)
(Continued)

(52) U.S. Cl.
CPC .......... *G06F 30/23* (2020.01); *G06F 2111/10* (2020.01); *G06F 2113/10* (2020.01); *G06F 2119/08* (2020.01)

(58) Field of Classification Search
CPC .. G06F 30/23; G06F 2111/10; G06F 2113/10; G06F 2119/08
(Continued)

(56) References Cited

U.S. PATENT DOCUMENTS

2004/0249809 A1 12/2004 Ramani et al.
2011/0074936 A1 3/2011 Gavrilenco
(Continued)

FOREIGN PATENT DOCUMENTS

| WO | WO 2014/074954 | 5/2014 |
| WO | WO 2016/133679 | 8/2016 |
| WO | WO 2020056388 | 3/2020 |

OTHER PUBLICATIONS

[No. Author Listed], "ASTM ISO/ASTM52910-17 Standard Guidelines for Design for Additive Manufacturing," ASTM International, 2016, West Conshohocken, PA, 14 pages.
(Continued)

*Primary Examiner* — Brian S Cook
(74) *Attorney, Agent, or Firm* — Fish & Richardson P.C.

(57) ABSTRACT

Methods, systems, and apparatus, including computer programs encoded on a computer storage medium, for simulating heat transfer in additive manufacturing. Implementations disclosed herein convert a model of an object into a node representation of the object, and generate an adjacency matrix of the object based on the node representation. For each layer of nodes in the node representation, implementations apply a simulated heat to the layer of nodes, and estimating a diffusion of heat to other nodes based on the adjacency matrix. Implementations generate a representation of an estimated heat distribution within the object.

20 Claims, 21 Drawing Sheets

(51) Int. Cl.
    *G06F 113/10* (2020.01)
    *G06F 119/08* (2020.01)
(58) Field of Classification Search
    USPC .......................................................... 703/6
    See application file for complete search history.

(56) References Cited

U.S. PATENT DOCUMENTS

| | | | |
|---|---|---|---|
| 2012/0206605 | A1 | 8/2012 | Buehler et al. |
| 2016/0321384 | A1* | 11/2016 | Pal .......................... B33Y 50/02 |
| 2017/0337307 | A1 | 11/2017 | Oancea et al. |
| 2022/0114307 | A1 | 4/2022 | Severson et al. |
| 2022/0284154 | A1 | 9/2022 | Yavari et al. |

OTHER PUBLICATIONS

Denlinger et al., "Thermomechanical model development and in situ experimental validation of the Laser Powder-Bed Fusion process, " Additive Manufacturing, 2017, 16:73-80, Accepted Manuscript.

Denlinger et al., "Effect of inter-layer dwell time on distortion and residual stress in additive manufacturing of titanium and nickel alloys," Journal of Materials Processing Technology, 2015, 215:123-131.

Denlinger et al., "Thermomechanical modeling of additive manufacturing large parts," J. Manuf. Sci. Eng., 2014, 136(6):061007-1-061007-8.

Dunbar et al., "Comparisons of laser powder bed fusion additive manufacturing builds through experimental in situ distortion and temperature measurements," Additive Manufacturing, 2017, 15:57-65, Accepted Manuscript.

Escolano et al., "Heat diffusion: Thermodynamic depth complexity of networks," Physical Review E, 2012, 85(3):036206, 15 pages.

Francois et al., "Modeling of additive manufacturing processes for metals: Challenges and opportunities," Current Opinion in Solid State and Materials Science, 2017, 21(4):198-206.

Ganeriwala et al., "Multiphysics modeling and simulation of selective laser sintering manufacturing processes," Procedia CIRP, 2014, 14:299-304.

Goldak et al., "A New Finite Element Model for Welding Heat Sources," Metallurgical Transactions B, 1984, 15:299-305.

Goldak et al., "Computer Simulation of Welding Processes," Computational Welding Mechanics, 2005, 16-69.

Khairallah et al., "Laser powder-bed fusion additive manufacturing: physics of complex melt flow and formation mechanisms of pores, spatter, and denudation zones," Acta Materialia, 2016, 108:36-45.

King et al., "Overview of modelling and simulation of metal powder-bed fusion process at Lawrence Livermore National Laboratory," Materials Science and Technology, 2014, 31(8):957-968.

King et al., "Laser powder bed fusion additive manufacturing of metals; physics, computational, and materials challenges," Appl. Phys. Rev., 2015, 2(4):041304, 27 pages.

Lee et al., "Mesoscopic simulation of heat transfer and fluid flow in laser powder bed additive manufacturing." International Solid Free Form Fabrication Symposium, 2015, 1154-1165.

Martukanitz et al., "Toward an integrated computational system for describing the additive manufacturing process for metallic materials," Additive Manufacturing, 2014, 1:52-63.

Michaleris, "Modeling metal deposition in heat transfer analyses of additive manufacturing processes," Finite Elements in Analysis and Design, 2014, 86:51-60.

Oterkus et al., "Peridynamic thermal diffusion," Journal of Computational Physics, 2014, 265:71-96.

PCT International Preliminary Report on Patentability in International Appln. No. PCT/US2019/051192, dated Mar. 25, 2021, 10 pages.

PCT International Search Report and Written Opinion in International Appln. No, PCT/US2019/051192, dated Nov. 25, 2019, 12 pages.

Raghavan et al., "Numerical modeling of heat-transfer and the influence of process parameters on tailoring the grain morphology of IN718 in electron beam additive manufacturing," Acta Materialia, 2016, 112:303-314.

Rosen, "Computer-aided design for additive manufacturing of cellular structures," Computer-Aided Design and Applications, 2007, 4(5):585-594.

Rosen, "Design for additive manufacturing: Past, present, and future directions," Journal of Mechanical Design, 2014, 136(9):090301, 2 pages.

Schoinochoritis et al., "Simulation of metallic powder bed additive manufacturing processes with the finite element method: A critical review," Proc IMechE Part B: J Engineering Manufacture, 2015, 231(1):96-117.

Silling et al., "A meshfree method based on the peridynamic model of solid mechanics," Computers and Structures, 2005, 83:1526-1535.

Sun et al., "Spectral Collocation Method for Transient Conduction-Radiation Heat Transfer," Journal of Thermophysics and Heat Transfer, 2010, 24(4):823-832.

Wang et al., "Topological design and additive manufacturing of porous metals for bone scaffolds and orthopaedic implants: a review," Biomaterials, 2016, 83:127-141.

Xiao et al., "Graph characteristics from the heat kernel trace, " Pattern Recognition, 2009, 42(11):2589- 2606.

Yang et al., "Design for Additive Manufacturing," Additive Manufacturing of Metals: The Technology, Materials, Design and Production, 2017, Springer, pp. 81-160.

Yavari et al., "Design Rules for Additive Manufacturing—Understanding the Fundamental Thermal Phenomena to Reduce Scrap," Procedia Manufacturing, 2019, 33:375-382.

Ye et al., "Numerical Modeling of Metal-Based Additive Manufacturing Using Level Set Methods," Journal of Manufacturing Science and Engineering, 2017, 139(7):071019-1-071019-8.

Zhang et al., "Graph spectral image smoothing using the heat kernel," Pattern Recognition, 2008, 41(11):3328-3342.

Cole et al., "Computational heat transfer with spectral graph theory: Quantitative verification," International Journal of Thermal Sciences, Jul. 2020, 153:106383, 15 pages.

Gouge et al., "Modeling forced convection in the thermal simulation of laser cladding processes," The International Journal of Advanced Manufacturing Technology, Feb. 4, 2015, 79:307-320.

Heigel et al., "Thermomechanical model development and validation of directed energy deposition additive manufacturing of Ti-6Al-4V," Additive Manufacturing, 2014, 5:9-19, 46 pages.

Heigel, "Thermo-Mechanical Model Development and Experimental Validation for Directed Energy Deposition Additive Manufacturing Processes," Thesis for the degree of Doctor of Philosophy, Pennsylvania State University, Mechanical Engineering, May 2015, 216 pages.

Romer, "Matlab Laser Toolbox User Manual," University of Twente, Enschede, Netherlands, Sep. 23, 2010, 19 pages.

Romer, "Matlab Laser Toolbox," Physics Procedia, Dec. 2010, 5:413-419.

Yan et al., "Review on thermal analysis in laser-based additive manufacturing," Optics & Laser Technology, Oct. 2018, 106:427-441.

Yavari et al., "Predicting Part-Level Thermal History in Metal Additive Manufacturing Using Graph Theory: Experimental Validation With Directed Energy Deposition of Titanium Alloy Parts," Presented at ASME 2019 14th International Manufacturing Science and Engineering Conference, Erie, PA, USA, Jun. 10-14, 2019, 7 pages.

Yavari et al., "Thermal Modeling in Metal Additive Manufacturing using Graph Theory," Journal of Manufacturing Science and Engineering, Jul. 2019, 141(7):071007, 20 pages.

* cited by examiner

300

Convert A Three-dimensional Model Of An Object Into A Node Representation Of The Object 302

Generate An Adjacency Matrix Of The Object Based On The Node Representation 304

- Sort Nodes Based On Z-coordinates To Define Layers Of The Object 304a
- Sort Nodes Based On Y-coordinates To Define Hatches 304b
- Build Adjacency Matrix Based On Relationships Between Nodes 304c

*Apply Simulated Heating To A Layer Of The Object As Represented By The Adjacency Matrix* 306

*Estimate Diffusion Of Heat To Other Layers Of The Object As Represented By The Adjacency Matrix* 308

*Repeat Steps 306 And 308 Until Heating And Heat Diffusion Have Been Simulated On Each Layer Of The Object As Represented By The Adjacency Matrix* 310

*Output A Representation Of The Expected Heat Distribution Within The Object* 312

FIG. 3

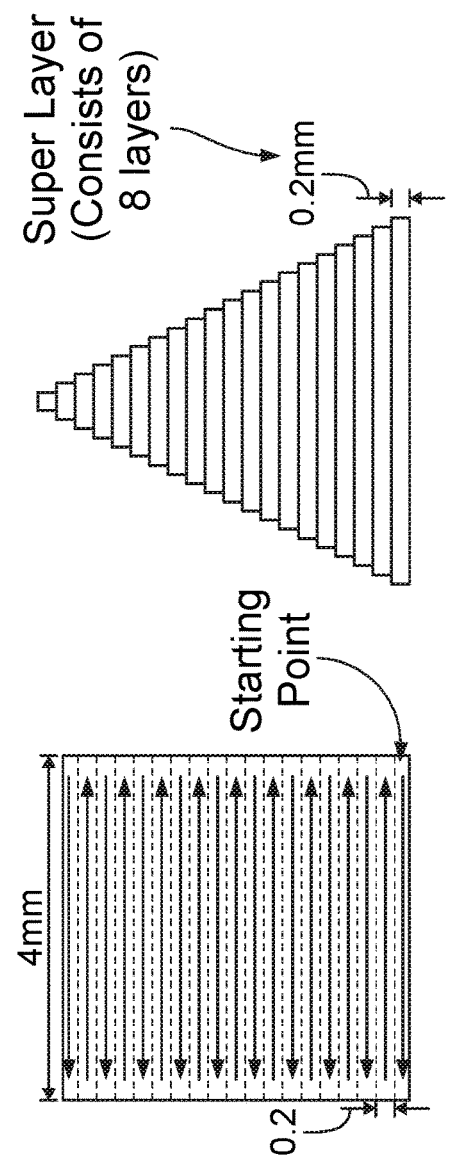
FIG. 10F
FIG. 10E
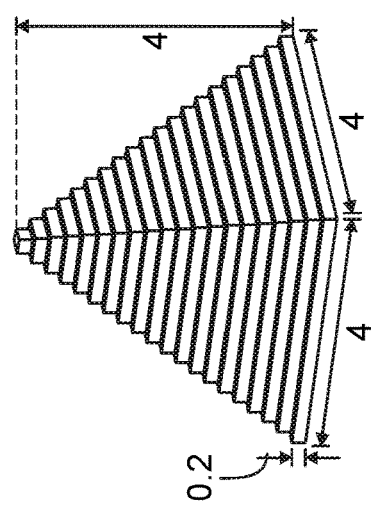
FIG. 10D (a)

SIMULATING HEAT FLUX IN ADDITIVE MANUFACTURING

CROSS-REFERENCE TO RELATED APPLICATION

This application is a National Stage Application under 35 U.S.C. § 371 and claims the benefit of International Application No.: PCT/US2019/051192, filed Sep. 13, 2019, which claims the benefit of the filing date of U.S. Provisional Application No. 62/730,876, filed on Sep. 13, 2018. The contents of U.S. Provisional Application No. 62/730,876 are incorporated by reference in their entirety.

FEDERALLY SPONSORED RESEARCH OR DEVELOPMENT

This invention was made with government support under Grant No. CMMI1752069 awarded by the U.S. National Science Foundation. The government has certain rights in the invention.

TECHNICAL FIELD

This disclosure relates to improvements to additive manufacturing processes.

BACKGROUND

Additive manufacturing (e.g., three-dimensional printing) is a process in which layers of material are sequentially applied and fused together. Inadequate heat dissipation can lead to failure of AM manufactured parts.

SUMMARY

The goal of this work is to predict the effect of part geometry and process parameters on the direction and magnitude of heat flow—heat flux—in parts made using metal additive manufacturing (AM) processes. As a step towards this goal, the techniques disclosed herein simulate heat diffusion over graphs to approximate the heat flux in metal AM parts as a function of their geometry. The graph theory (GT) based modelling processes disclosed herein are consequential to overcoming the poor process consistency and part quality in AM. Currently, part build failure rates in metal AM often exceed 20%, the causal reason for this poor part yield in metal AM processes is ascribed to the nature of the heat flux in the part. For instance, constrained heat flux causes defects such as warping, thermal stress-induced cracking, etc. Hence, to alleviate these challenges in metal AM processes, there is a need for computational thermal models to estimate the heat flux, and thereby guide part design and selection of process parameters. Compared to moving heat source finite element analysis techniques, the proposed graph theoretic approach facilitates layer-by-layer simulation of the heat flux within a few minutes on a desktop computer, instead of several hours on a supercomputer.

Advantageously, the GT modeling systems and techniques described herein may provide for one or more benefits, such as computationally efficient yet highly accurate computer simulations of heat distribution in AM parts. For example, implementations described herein can reduce computation time to estimate the heat flux in AM parts from over three hours when preformed using existing process on a super computer to less than three minutes on a desktop computer. For example, the process parameters, appropriate part orientation, part design, recommendation on placement of supports can be quickly narrowed using implementations of the present disclosure, thereby substantially reducing the need for expensive and time-consuming experimental studies to optimize the design and processing conditions for AM parts. For example, implementations can thus be used by practitioners as a guideline for design of AM parts. Furthermore, implementations expose red flags where the part is liable to fail it can substantially reduce scrap and rework rates. Furthermore, the thermal gradients predicted by some implementations can be directly used as inputs in existing models that predict the residual stresses, deformation of parts, and microstructure evolved. Another use of the described system is in coupling it with in-situ sensor data for monitoring and controlling the process in an optimal state. Some implementations can be implemented and ported on a mobile device, such as a smartphone or hand held tablet because of its low computational complexity, thus enabling its use in the field.

The details of one or more implementations are set forth in the accompanying drawings and the description below. Other features, objects, and advantages will be apparent from the description and drawings, and from the claims.

DESCRIPTION OF DRAWINGS

FIG. 3 depicts an example process for modeling heat flux in AM parts that can be executed in accordance with implementations of the present disclosure.

FIGS. 10D-10F various views of an example pyramid object used in tests of the heat flux modeling processes described herein.

Like reference symbols in the various drawings indicate like elements.

DETAILED DESCRIPTION

The goal of this work is to accurately and efficiently model the effect of process parameters and part design on the heat flux, i.e., the magnitude and direction of heat flow in metal parts, as they are being deposited (printed) layer-by-layer using metal additive manufacturing (AM) processes, such as laser powder bed fusion (LPBF) and directed energy deposition (DED). In pursuit of this goal, the objective of this patent disclosure is to develop and apply a graph theoretic (GT) approach to approximate the heat flux in metal AM parts. The motivating reasons for this invention are two-fold.

In metal AM, the physio-mechanical properties of the part, such as its geometric integrity and microstructure, are governed by thermal process phenomena. These thermal aspects of the process are in turn entwined with the part design, support structure, and process parameters. However, optimizing the design and process parameters in AM using statistical experimentation methods is prohibitively expensive as it involves adjustment of several parameters, followed by destructive materials characterization. A statistical designed experiments-based approach is therefore not viable given the small batch sizes in AM and the slow nature of the process compared with conventional manufacturing.

Figure 1:
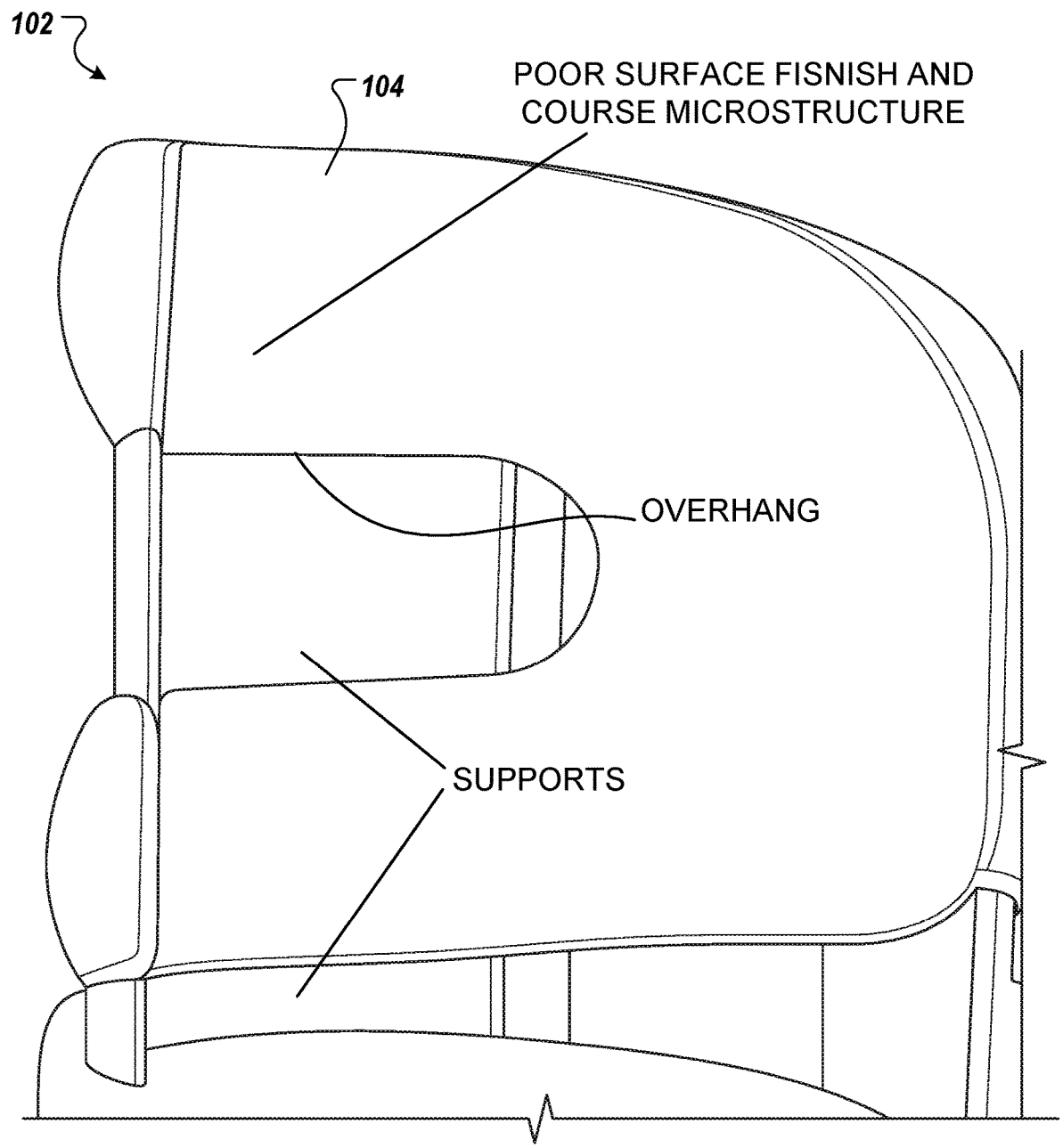
FIG. 1 illustrates a biomedical titanium knee implant built by the inventors using the LPBF process.

The need for a formal framework based on fundamental understanding of the thermal physics of the process to guide the design of the AM parts is illustrated in FIG. 1. FIG. 1 illustrates an AM part 102, i.e., a biomedical titanium knee implant, built by the inventors using the LPBF process. This AM part 102 has a feature called an overhang 104, where the underside is not supported. To prevent the part 102 from collapsing, supports were automatically built under the overhang section. Nonetheless, after the build, the overhang 104 area was found to have coarse-grained microstructure and poor surface finish, which makes it potentially unsafe in clinical use. Such defects are due to the heat being constrained in the overhang 104 section. The reason for the constrained heat in the overhang 104 section is hypothesized due to the low thermal conductivity of the surrounding metal powder, and the overly thin cross-section area of the supports. Through accurate simulations of the effect of process conditions and part design on heat flux, the occurrence of defects, such as geometric deformation, microstructure heterogeneity, etc., that result from the steep thermal gradients can be minimized.

Accurate quantitative approaches, particularly those based on finite element analysis (FEA) have been developed and applied for understanding the thermal aspects of AM at the part-level. However, these pioneering non-proprietary approaches reported in the published literature are computationally expensive, with simulation of a few deposited layers amounting to many hours of computation on a super computer. Hence, newer approaches are needed to quickly, yet accurately, approximate the heat flux given different part designs and process parameters.

The aim of the GT moiling process disclosed herein is to solve the so-called heat equation, as it appears hereunder, using a discrete graph theoretic approximation approach.

$$\frac{\partial T}{\partial t} - \alpha\left(\frac{\partial^2 T}{\partial x^2} + \frac{\partial^2 T}{\partial y^2} + \frac{\partial^2 T}{\partial z^2}\right) = 0 \qquad (1).1$$

In the heat equation, T(x, y, z, t) refers to the temperature, t is the time, and x, y, and z the Cartesian spatial coordinates for a given part geometry. From the AM perspective, the term $\partial T/\partial t$ is analogous to the rate of change temperature at a particular point in the part referenced by its coordinates (x, y, z) as it is heated by a moving energy source while being completed layer-upon-layer, e.g., a laser in LPBF. Representing the continuous Laplacian operator $$\Delta(T) \stackrel{def}{=} \left(\frac{\partial^2}{\partial x^2} + \frac{\partial^2}{\partial y^2} + \frac{\partial^2}{\partial z^2}\right)T,$$

the heat equation reduces to, $$\frac{\partial T}{\partial t} - \alpha\Delta(T) = 0 \qquad (1).2$$

The graph theoretic approach for solving the heat equation of Eqn. (1) is based on discretizing the continuous Laplacian operator $\Delta$, by a weighted and undirected graph over a grid of points (nodes) sampled within the geometry of the part. The continuous Laplacian operator $\Delta$ is then approximated by a discrete Laplacian operator (L) called the graph Laplacian Matrix. As discussed in more detail below, the discrete Laplacian L allows for solutions of the heat equation to be constructed from its eigenvectors ($\phi$) and eigenvalues ($\Lambda$): the solution takes the form, $$T(x,y,z,t) = e^{-\alpha(\phi'L\phi)} = \phi'e^{-\alpha\Lambda t}\phi$$

Discrete differential operators arise from partial differential equations (PDEs) such as the heat equation: and the Laplacian matrix constructed from a uniformly-spaced grid gives a solution to the heat equation. If the grid is not equally spaced, the relationship to the correct solution of the heat equation is not clear. However, a discrete Laplacian matrix approaches the continuous Laplacian in the limit as the grid become sufficiently fine, even if the grid pattern is non-uniform, e.g., by an algorithm that includes multiplicative factor $l/h^2$ where h which is the size of the neighbourhood of influence for nearby grid points. It is possible to use randomly-assigned node locations to construct a discrete Laplacian matrix and subsequently to solve the heat equation.

The advantage of the proposed GT solution is that instead of solving the heat equation for each element through element birth-and-death techniques as in FEA, the disclosed process tracks the heat flux in the part in terms of nodes of a planar graph projected onto its geometry. While the FEA approach requires matrix inversion steps, the GT method instead relies on matrix multiplication operations.

Furthermore, our efforts in using FEA-based approaches to verify results from our graph theoretic approach, leads us to infer that, a significant portion of the computation effort in FEA is consumed by the meshing step. The graph-based approach circumvents the need for meshing and would be valuable for quick approximation of the heat flux given a part design, support, and process parameters. As a result, the computation time for simulation of AM processes can be considerably reduced compared to existing, non-proprietary FEA-based approaches. We note that the presently disclosed process is distinct from the mesh-free methods developed for peridynamics of systems undergoing dynamic cracking, and it is also different from spectral collocation methods where splines provide an a priori functional form of the solution as part of a standard matrix-inversion process.

FIG. 3 depicts a flowchart of an example process 300 for GT modeling of heat flux in AM parts that can be executed in accordance with implementations of the present disclosure. The example process 300 can be implemented, for example, by one or more computing systems. Exemplary computing systems can include, but are not limited to, a super computer, a desktop computer, a laptop computer, or a tablet computer. In some examples, the example process 300 can be provided by one or more computer-executable programs executed using one or more computing devices. For example, the example process 300, or portions thereof, can be provided by one or more programs executed by a computing system.

Figure 2A:
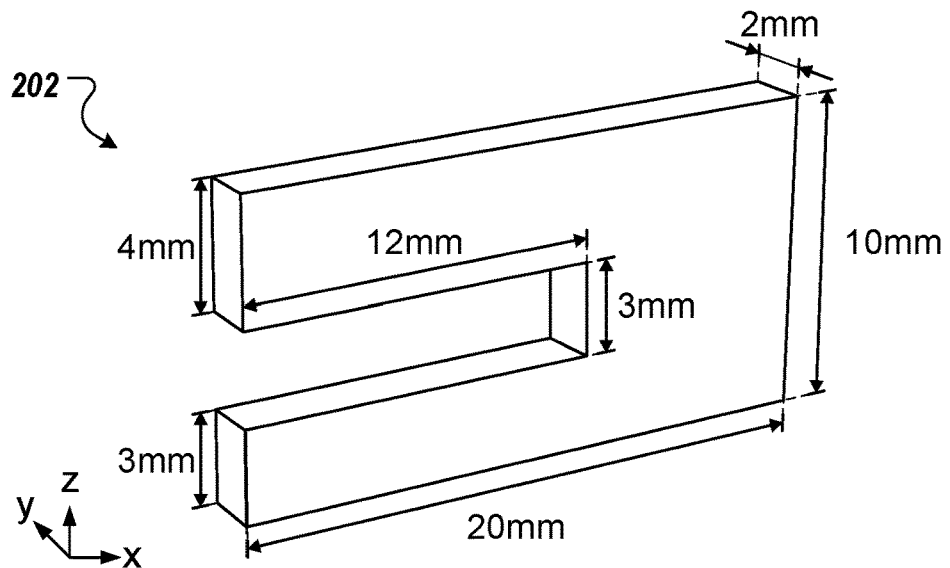
FIGS. 2A-2C illustrate several views of an exemplary AM part.
Figure 2B:
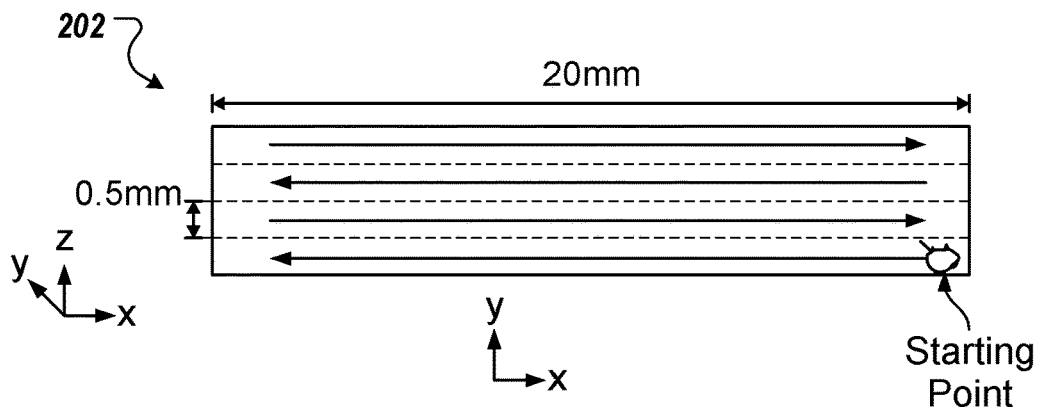
Figure 2C:
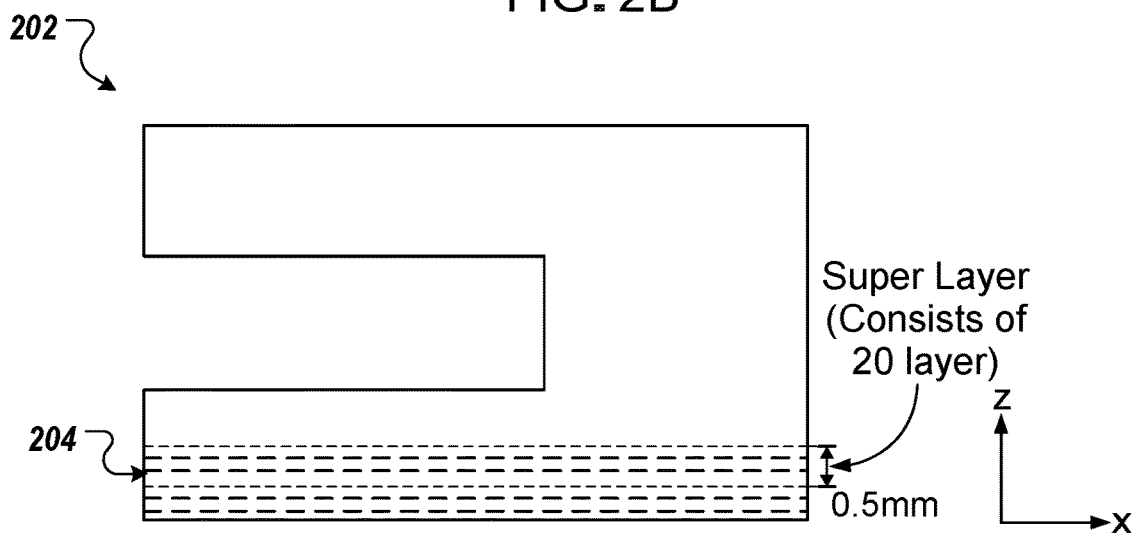
Figure 4A:
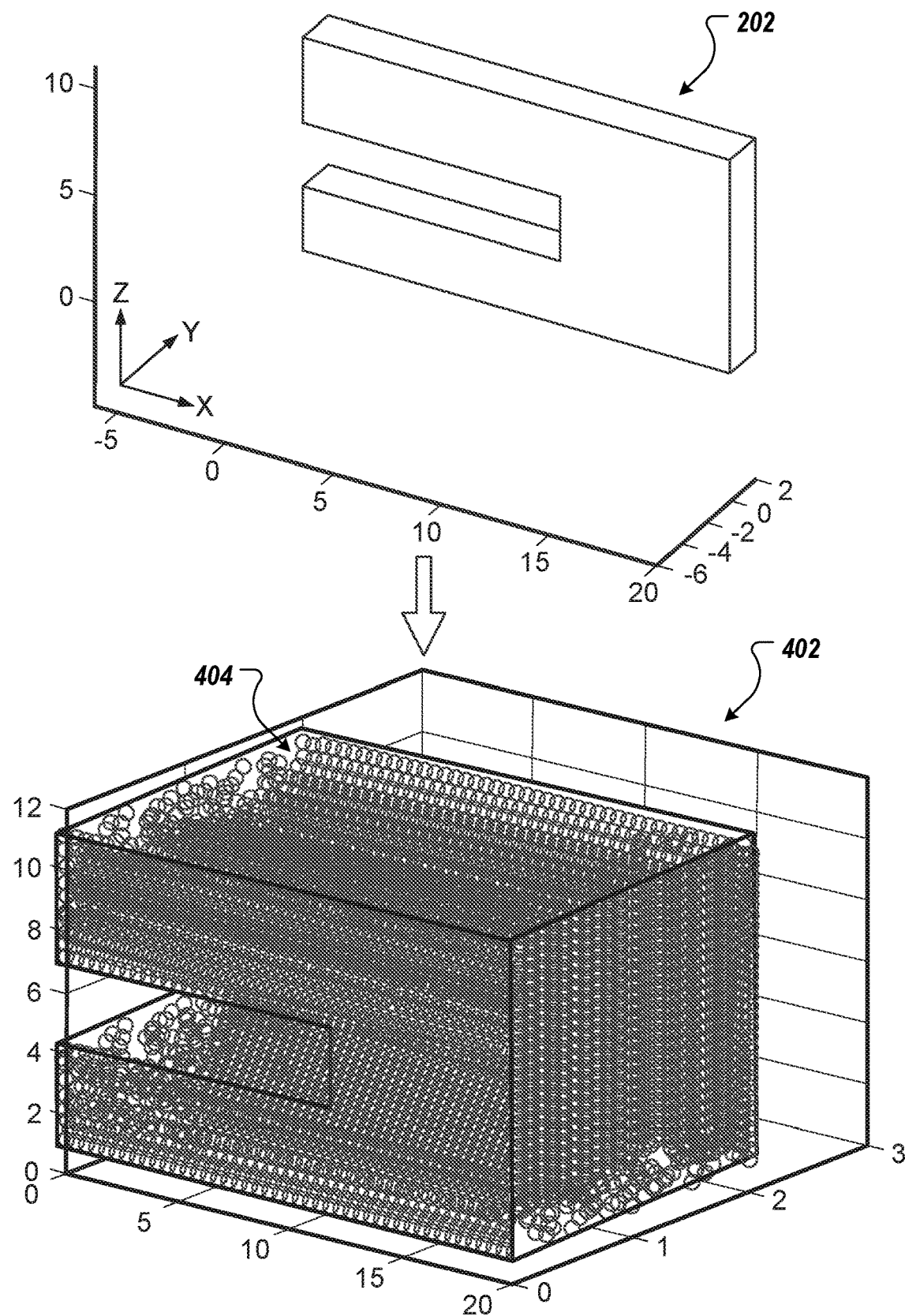
FIG. 4A depicts a graphical illustration of the conversion of a three-dimensional model of an AM part into a node representation.

Referring to FIGS. 2A-2C, 3, and 4A, the computing system converts a three-dimensional model of an AM part 202 into a node representation 402 of the AM part (302). FIGS. 2A-2C illustrate several views of an exemplary AM part 202. FIG. 4A depicts a graphical illustration of the conversion of a three-dimensional model of the AM part 202 into a node representation 402. For example, the three-dimensional part 202 is sliced into layers 204 (FIG. 2C), representative of the layer thickness, and a fixed number of spatial locations are randomly sampled in each layer 204. The heat flux through the part is determined at these fixed spatial locations, termed nodes 404. The random sampling of the nodes 404 reduces the computational burden of the approach. The number of nodes 404 is contingent on the geometry of the part, in this example, a density of 5 nodes per mm$^2$ provided a sufficiently good approximation to the heat flux estimated with a moving heat source solution obtained through FEA. In some implementations, the number of notes 402 is also be contingent on modeling parameters. The modeling parameters may be user selected parameters or predetermined (e.g., default) parameters. Modeling parameters can include, but are not limited to, a number of layer (e.g., number of AM deposition layers to be modeled), the layer size (e.g., thickness of each layer), a number of hatches to be used in the modeling, the hatch size (e.g., width of each hatch), the number of nodes to be sampled per hatch, or a combination thereof.

Figure 4B:
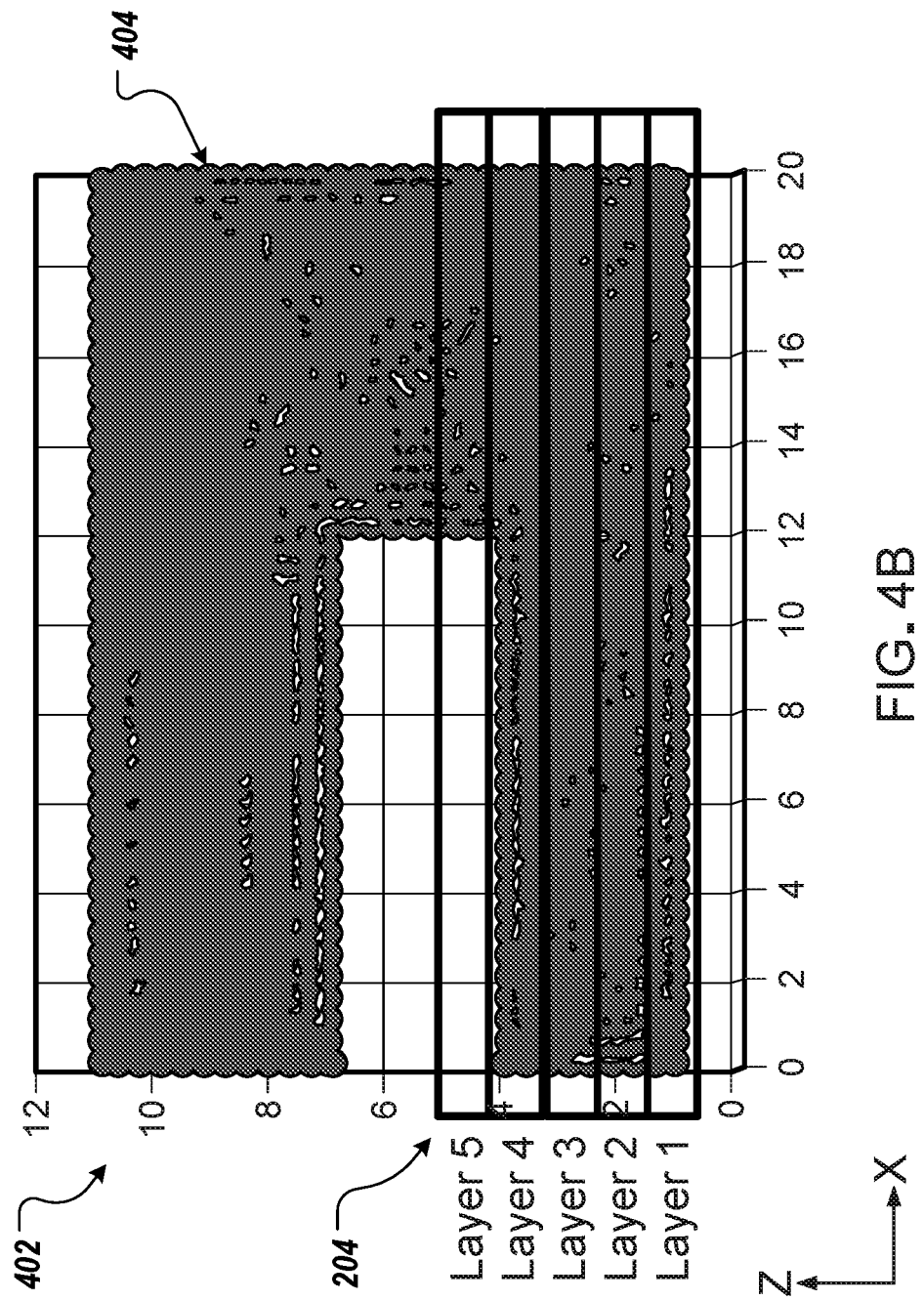
FIG. 4B depicts a graphical representation of nodes being sorted into layers.
Figure 4C:
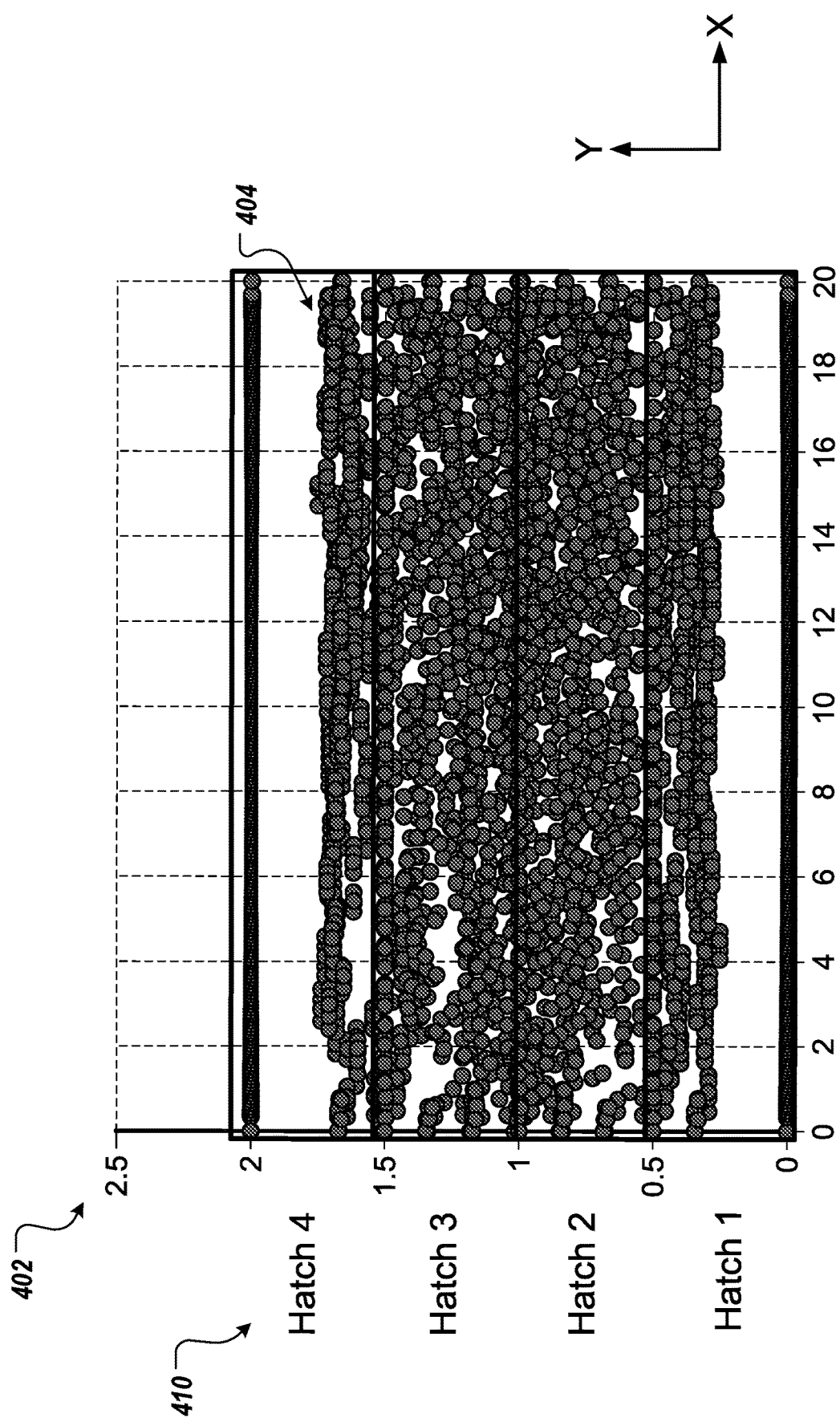
FIG. 4C depicts a graphical representation of nodes being sorted into hatches.
Figure 4D:
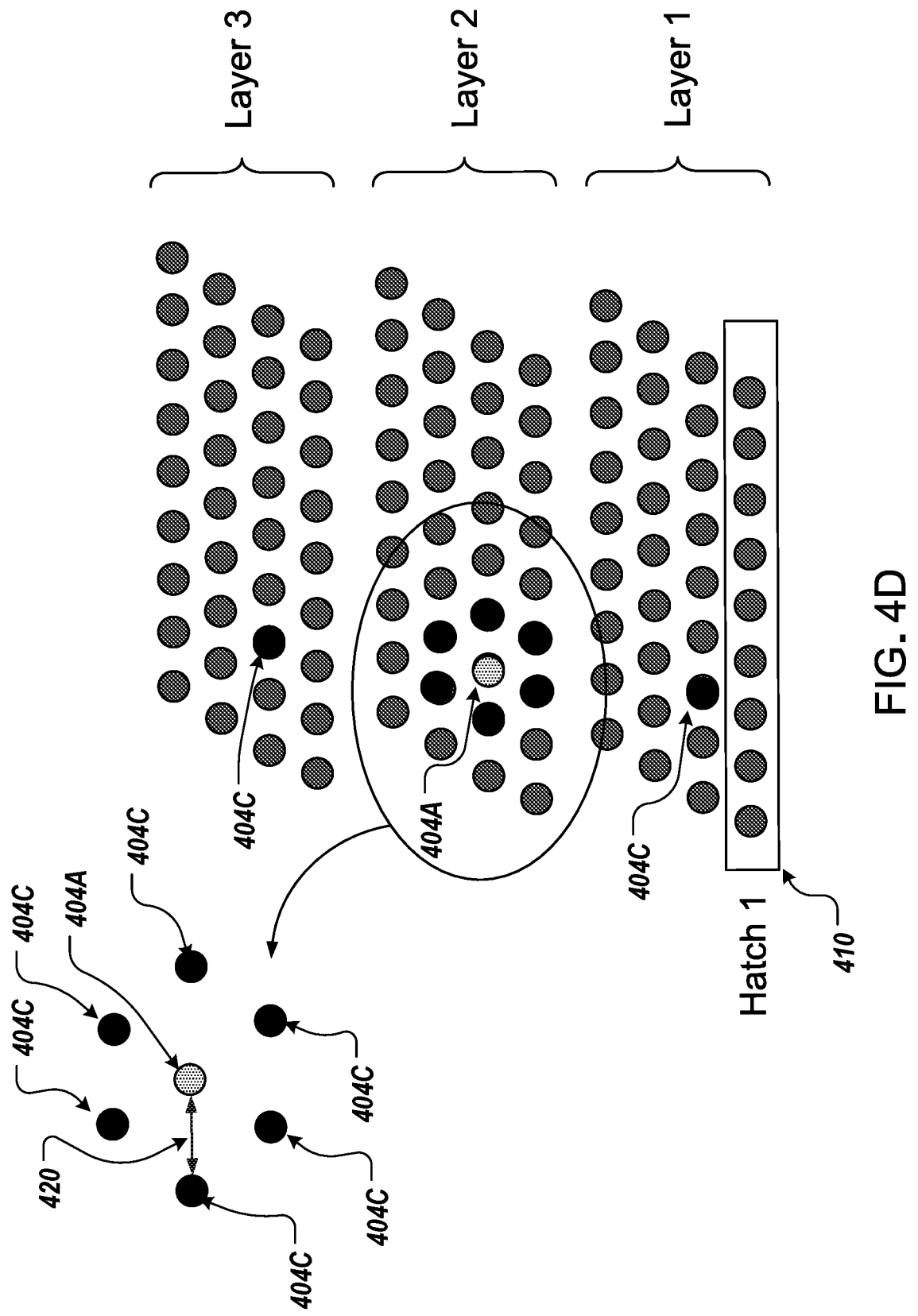
FIG. 4D depicts a graphical representation of generating a weight for a node of an adjacency matrix based on neighbouring nodes.

Referring to FIGS. 3 and 4A-4E, the computing system generates an adjacency matrix of the AM part 202 based on the node representation 402 (304). For example, the computing system constructs a network graph from the nodes as each layer is simulated to be deposited by the recoater. Step 304 can include three sub-steps which are described in more detail below. Briefly the sub-steps can include: sorting nodes based on z-coordinates to define layers 204 of the object (304a). FIG. 4B depicts a graphical representation of nodes 404 being sorted into layers 204. In FIG. 4B the node representation 402 of the AM part 202 is depicted from a side view. Sorting nodes based on y-coordinates to define hatches 410 (304b). FIG. 4C depicts a graphical representation of nodes 404 being sorted into hatches 410. In FIG. 4C the node representation 402 of the AM part 202 is depicted from a top view. Each hatch 410 is a "horizontal" grouping of nodes within the same layer 204. Building an adjacency matrix based on relationships between the nodes (304c). FIG. 4D depicts a graphical representation of generating a weight for a node 404A of an adjacency matrix based on neighbouring nodes 404B.

In more detail, the computing system calculates a graph over the set of nodes 404 sampled in Step 302. The aim is to connect a pair of nodes $\pi_i$ (404A) and $\pi_j$ (404B) within an & neighbourhood per a kernel function $\Omega$. The nodes are indexed by their spatial coordinates (x,y,z) in the part. In other words, the pairwise distance (depicted as 420 in FIG. 4D) between any two nodes $\pi_i$ and $\pi_j$ (e.g., nodes 404A and 404B of FIG. 4D) is determined via the function $\Omega$ and if the distance 420 is less than ε, then these two nodes will be connected by an edge between them, this is expressed in mathematical terms as below, with Gaussian radial basis function $\Omega$.

$$a_{ij} = \begin{cases} e^{-\frac{(\pi_i - \pi_j)^2}{\sigma^2}}, & (\pi_i - \pi_j)^2 \leq \epsilon \\ 0, & (\pi_i - \pi_j)^2 > \epsilon \end{cases} \quad (2)$$

where $(\pi_i-\pi_j)^2$ is the square of the distance between nodes $\pi_i$ and $\pi_j$ (e.g., distance 420 between nodes 404A, 404B). Each of nodes 404B and 404C are within the distance ε of node 404A, and thus, would be considered to be with in the ε neighbourhood of node 404A. The matrix formed of weights $a_{ij}$ is called the adjacency matrix, A. In this work, the term ε is akin to the radius of a sphere within which all nodes are connected, and σ is the standard deviation of the pairwise distances.

$$A = \lceil a_{ij} \rceil \quad (3)$$

The matrix A is symmetric and sparse. The next step involves computing the degree $d_i$ of a node i, i.e., the number of edges that are connected to the node i. The degree of node $\pi_i$ is computed by summing each row of the Adjacency matrix A, $$d_i = \sum_{...} a_{ij} \quad (4)$$

From the degree of node $d_i$, the Laplacian $l_{ij}$ at node i is defined as follows, $$l_{ij} \stackrel{\text{def}}{=} d_i - a_{ij} \quad (5)$$

We note that $\Sigma_{\forall j} l_{ij} = 0$; if the diagonal degree matrix D is formed as follows, $D \stackrel{\text{def}}{=} \text{diag}(d_1, \ldots, d_M)$. Then given adjacency matrix A, the discrete Laplacian L can be cast in matrix form as, $$L \stackrel{\text{def}}{=} (D-A) \quad (6)$$

Finally, the Eigen spectra of the Laplacian L is computed; $L\phi=\Lambda\phi$.

Figure 4E:
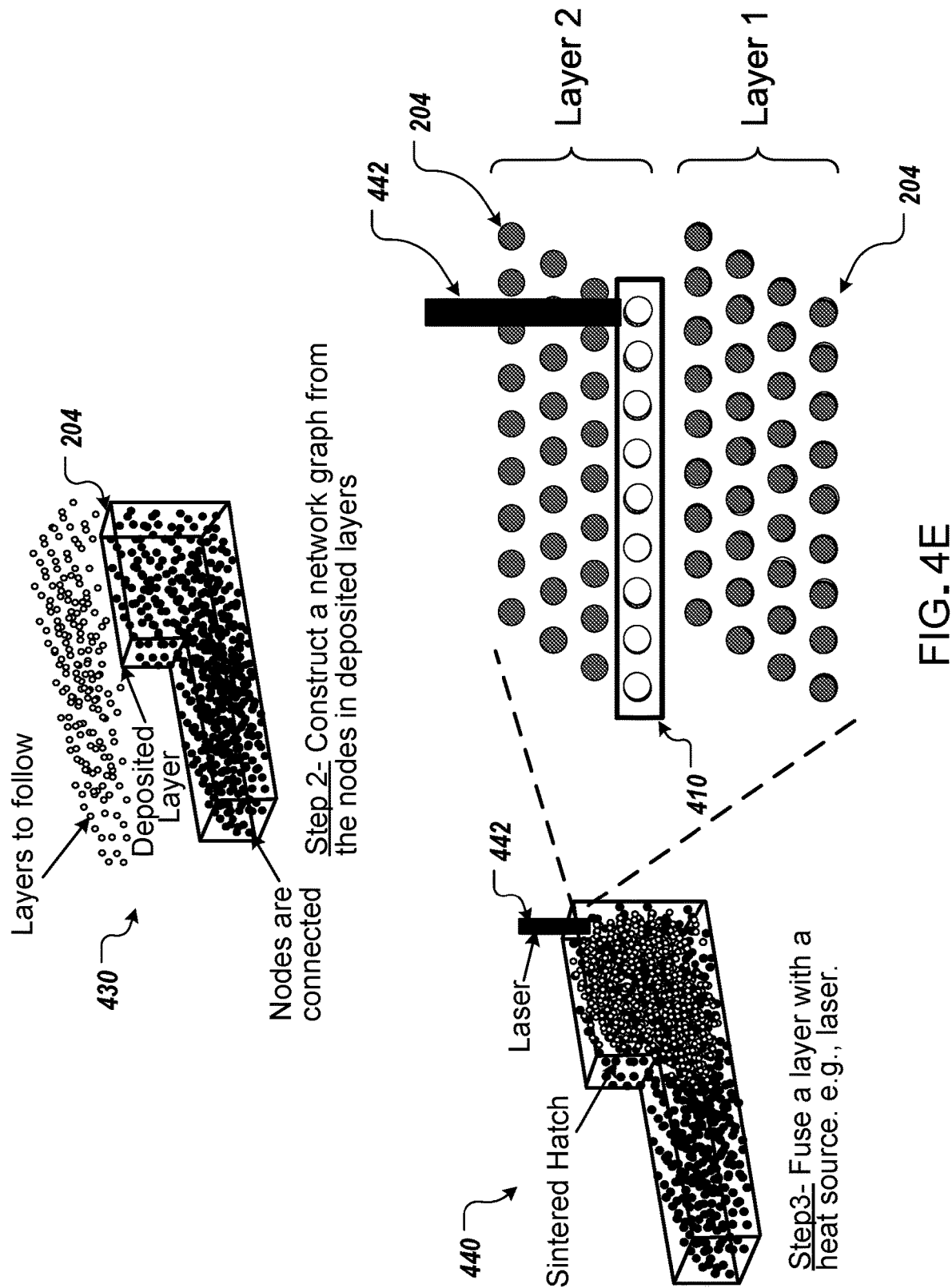
FIG. 4E depicts a graphical representation of a layer fusion simulation.

The system simulates the fusion of each layer 204 hatch-by-hatch by applying simulated heat to a layer 204 of the node representation 402 of the AM part 202 as represented by the adjacency matrix (306). FIG. 4E depicts a graphical representation of a layer fusion simulation. For example, the simulated heat from the laser is applied to the layer 204 (e.g., the simulated powder bed) in the form of linear hatches 410. The magnitude of heat applied is indexed as H(x,y,z). Where the time taken to fuse a layer 204 is considered infinitesimal compared to the time it takes the bed to be lowered and to the recoater to deposit a new layer 204. For practical application in simulating LPBF or DED, H(x,y,z) is the initial condition, but it can be considered as a volumetric energy density in Joules/mm³ applied at a particular volume. The volumetric energy density is given by $$E_V = \frac{P}{h \cdot v \cdot t} J/mm^3,$$

where P is the laser power in Watts, h is the distance between adjacent passes of the laser (called hatch spacing, mm), v is the velocity of the laser in mm/s, and t is the layer height (mm).

For example, FIG. 4E illustrates the process of step 306 graphically. Diagram 430 illustrates the selection of a layer 204 to be fused, e.g., the simulated deposition of a new layer. That is, the selected layer 204 is the layer to which the simulated heat will be applied during each particular iteration of step 306. Diagram 440 illustrates the simulation of heat being applied by a laser 442 along each hatch 410 of the selected layer 204. For instance, in the enlarged region of diagram 440, Layer 2 represents the selected layer 204 that is being fused during step 306. As depicted, the simulated heat (e.g., by simulated laser 442) is applied along each linear hatch 410 of the layer 204.

The system estimates the diffusion of heat to other layers 204 of the noted representation 402 of the AM part 202 using the adjacency matrix (308). For example, the heat diffuses to the rest of the part within the powder bed, and through the substrate in the time t it takes to lower the bed and deposit material. As discussed below, the eigenvectors $\phi$ of the Laplacian L provide a discrete solution to the heat equation, specifically, if $\phi'$ is the transpose of $\phi$, then the temperature profile at time step $\tau$ for a node at position (x, y, z) is given by the following, $$T(x,y,z,t) = H(x,y,z)e^{-\alpha(\phi'L\phi)t} \quad (7)$$

Where the material-related factors are contained in the term $\alpha$. In step 310 the heat flux across layers is estimated by repeating Steps 304 through 308 until the part is built.

For the Neumann, Robin, and Dirichlet boundary conditions, it can be shown that the eigenvalues ($\Lambda$) of the Laplacian operator are discrete and non-negative, and the eigenfunctions (eigenvectors) are orthogonal, i.e., $\langle \phi_i, \phi_j \rangle = 0$, assuming that the domain $\Omega$ of the Laplacian is bounded, connected and compact). Hence, the key idea for solving the heat equation of Eqn. (1) is to assume that the continuous Laplacian operator $\Delta$ can be discretized over the space $\Omega$; essentially, the process 300 constructs a discrete Laplacian operator (Laplacian Matrix) L over a grid laid over the part.

If the grid is defined in a way such that when its points (vertices or nodes) are connected with edges, the resulting adjacency matrix A in Eqn. (3) is real, and therefore its Laplacian matrix (L, Eqn. (6)) is diagonally dominant and symmetric, i.e., semidefinite positive semidefinite. Hence, the orthogonality of Eigenvectors and non-negativity of eigenvalues is preserved. Furthermore, because the transpose of an orthogonal matrix is the same as its inverse, i.e., $\phi^{-1}=\phi'$, and $\phi\phi'=I$, hence, $\Lambda=\phi'L\phi$. On substituting the foregoing into the Helmholtz equation $\Delta(T)=-\Lambda(T)$, we obtain $-\Delta(T)=\phi'L\phi(T)$. Plugging the last relationship into the heat equation (Eqn. (1)) and solving the partial differential equation—consider a unit heat source is applied, i.e., H(x, y, z)=1, obtains, $$\frac{\partial T}{\partial t} + \alpha(\phi'L\phi)(T) = 0 \Rightarrow T(x, y, z, t) = e^{-\alpha(\phi'L\phi)} \quad (8)$$

This formal solution will be simplified by considering the Taylor Series expansion of the term $e^{-\alpha(\phi^T L\phi)}$, and substituting, $\phi\phi'=I$ and $L\phi=\Lambda\phi$, as follows, $$e^{-\alpha(\phi^T L\phi)} = 1 + \frac{(-\alpha(\phi'L\phi)t)}{1!} + \frac{(-\alpha(\phi'L\phi)t)^2}{2!} + \frac{(-\alpha(\phi'L\phi)t)^3}{3!} + \ldots \quad (9)$$

$$= 1 - \alpha t\frac{\phi'\Lambda\phi}{1!} + \alpha^2 t^2 \frac{(\phi'\Lambda\phi)(\phi'\Lambda\phi)}{2!} -$$

$$\alpha^3 t^3 \frac{(\phi'\Lambda\phi)(\phi'\Lambda\phi)(\phi'\Lambda\phi)}{3!} + \ldots$$

$$= 1 - \frac{\phi'\Lambda\alpha t\phi}{1!} + \frac{\phi'(\Lambda\alpha t)^2\phi}{2!} - \frac{\phi'(\Lambda\alpha t)^3\phi}{3!} + \ldots$$

$$e^{-\alpha(\phi'L\phi)} = \phi'e^{-\alpha\Lambda t}\phi \therefore T(x, y, z, t) = e^{-\alpha(\phi'L\phi)t} = \phi'e^{-\alpha\Lambda t}\phi$$

Hence, the heat equation is solved as a discrete function of the eigenvectors and eigenvalues of the graph Laplacian L.

Steps 306 and 308 (of FIG. 3) are repeated until heating and heat diffusion have been simulated on each layer 204 of nodes 404. Then, a representation of the estimated heat distribution within the AM part is output (312). For example, the computing system can generate a three-dimensional heat map of the estimated heat flux within the AM part, e.g., such as those depicted in the Heat Distribution GT row of Table 4 depicted in FIG. 14.

In some implementations, one or more of the following simplifying assumptions can be applied to the graph theoretic approach. 1) The thermal properties of the material are static, in that, they do not change as the material changes state from particulate matter to a liquid (meltpool formation), and then back to a solid. 2) The laser rays are completely absorbed in the topmost layer and are not repeatedly reflected by the powder. 3) There is only one single part in the build plate at a given time, hence there is no heat exchanged with other parts. 4) The part boundary is completely insulated, and no heat is lost on account of convective heat transfer at the topmost layer. 5) The laser in LPBF and DED is considered a moving heat source that is focused at a single point, i.e., the beam diameter and shape, and subsequent diffusion on the powder bed surface are not accounted. 6) The time required by the laser to fuse a layer is infinitesimal compared to the time taken to deposit a new layer. Hence, heat dissipation occurs only during the powder deposition process as the bed is lowered and the recoater applies a new layer. In some examples, these assumptions can be relaxed to provide a more comprehensive model.

Figure 5:
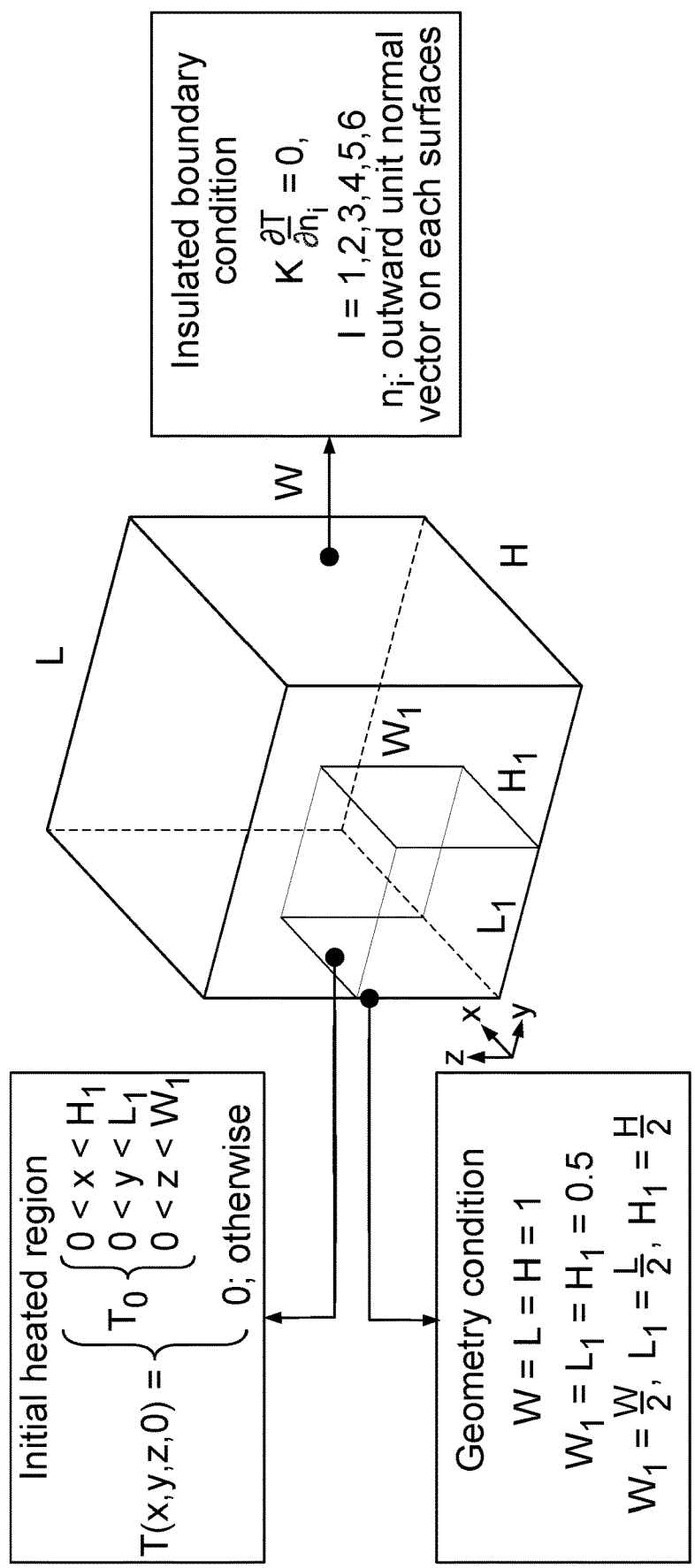
FIG. 5 depicts a cube with the initial heating condition and insulated boundaries.

The following discussion explains the accuracy of the graph theory thermal modeling in comparison to an analytical and finite element solution for a simple test case. The test case is about the heat diffusion in a cube. The cube is assumed to be insulated on the boundaries which results in internal heat dispersion until a steady-state condition is achieved. There is a fixed volume inside the cube which is considered to be initially heated and diffuses heat over time. Each edge of this heated volume is exactly half of the entire cube, meaning the volume of the heated section is one-eighth of the cube. FIG. 5 shows the experimented geometry, initial heated region, and the boundary conditions imposed upon the system. Specifically, FIG. 5 shows a cube with the initial heating condition and insulated boundaries.

The above problem can be made dimensionless by the following parameters:

$$\tilde{x} = \frac{x}{L}; \tilde{y} = \frac{y}{W}; \tilde{z} = \frac{Z}{H}; \tilde{W} = \frac{W}{L}; \tilde{H} = \frac{H}{L} \quad (10)$$

$$\tilde{L}_1 = \frac{L_1}{L}; \tilde{W}_1 = \frac{W_1}{W}; \tilde{H}_1 = \frac{H_1}{H}; \tilde{t} = \frac{at}{L^2}; \tilde{T} = \frac{T}{T_0}$$

Then the dimensionless form of the heat equation and boundary value problem for the cube-shape are given by:

$$\frac{\partial^2 \tilde{T}}{\partial \tilde{x}^2} + \frac{1}{\tilde{W}^2}\frac{\partial^2 \tilde{T}}{\partial \tilde{y}^2} + \frac{1}{\tilde{H}^2}\frac{\partial^2 \tilde{T}}{\partial \tilde{z}^2} = \frac{\partial \tilde{T}}{\partial \tilde{t}}; \begin{cases} 0 < \tilde{x} < 1; \\ 0 < \tilde{y} < 1; \\ 0 < \tilde{z} < 1; \end{cases} \quad (11)$$

At boundary i, $$\frac{\partial \tilde{T}}{\partial \tilde{n}_i} = 0, i = 1, 2, 3, 4, 5, 6 \quad (12)$$

$$T(\tilde{x}, \tilde{y}, \tilde{z}, 0) = \begin{cases} T_0 \begin{cases} 0 < \tilde{x} < \tilde{L}_1 \\ 0 < \tilde{y} < \tilde{W}_1 \\ 0 < \tilde{z} < \tilde{H}_1 \end{cases} \\ 0; \text{otherwise} \end{cases} \quad (13)$$

Thus, the dimensionless form of the analytical diffusion is calculated with help of Eqn. (14). Thermal diffusivity coefficient (a) corresponds to the material properties which is assumed as 1 (m²/s) in this study.

$$T(\tilde{x}, \tilde{y}, \tilde{z}, \tilde{t}) = \left[\tilde{L}_1 + 2\sum_{m=1}^{\infty} \exp(-m^2\pi^2\tilde{t})\frac{\cos(m\pi\tilde{x})\sin(m\pi\tilde{a})}{m\pi}\right] \times \quad (14)$$

$$\left[\tilde{W}_1 + 2\sum_{n=1}^{\infty} \exp\left(\frac{-n^2\pi^2\tilde{t}}{\tilde{W}^2}\right)\frac{\cos(n\pi\tilde{y})\sin(n\pi\tilde{W}_1)}{n\pi}\right] \times$$

$$\left[\tilde{H}_1 + 2\sum_{p=1}^{\infty} \exp\left(\frac{-p^2\pi^2\tilde{t}}{\tilde{H}^2}\right)\frac{\cos(p\pi\tilde{z})\sin(p\pi\tilde{H}_1)}{p\pi}\right]$$

Figure 6A:
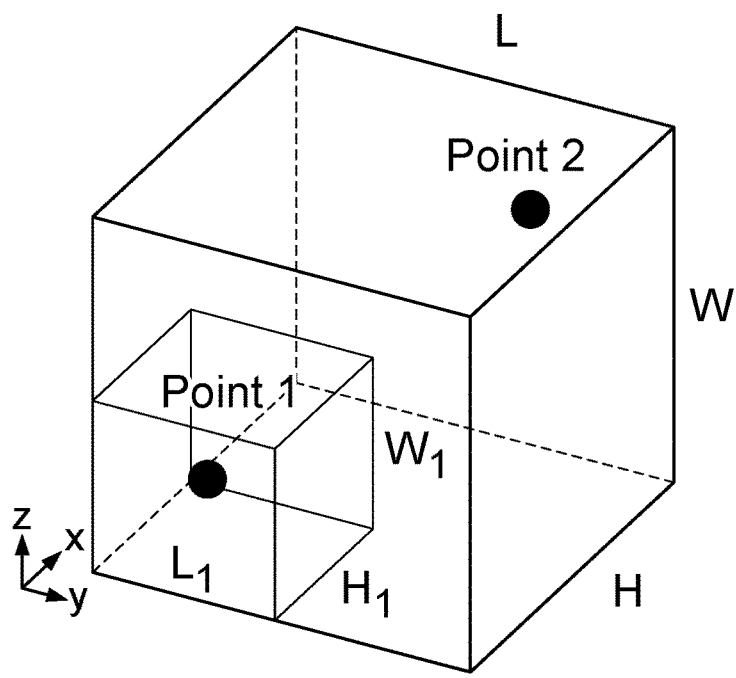
FIG. 6A illustrates the cube with observation points: point 1: (0.25H, 0.25L, 0.25W) and point 2: (0.75H, 0.75L, 0.75W).
Figure 6B:
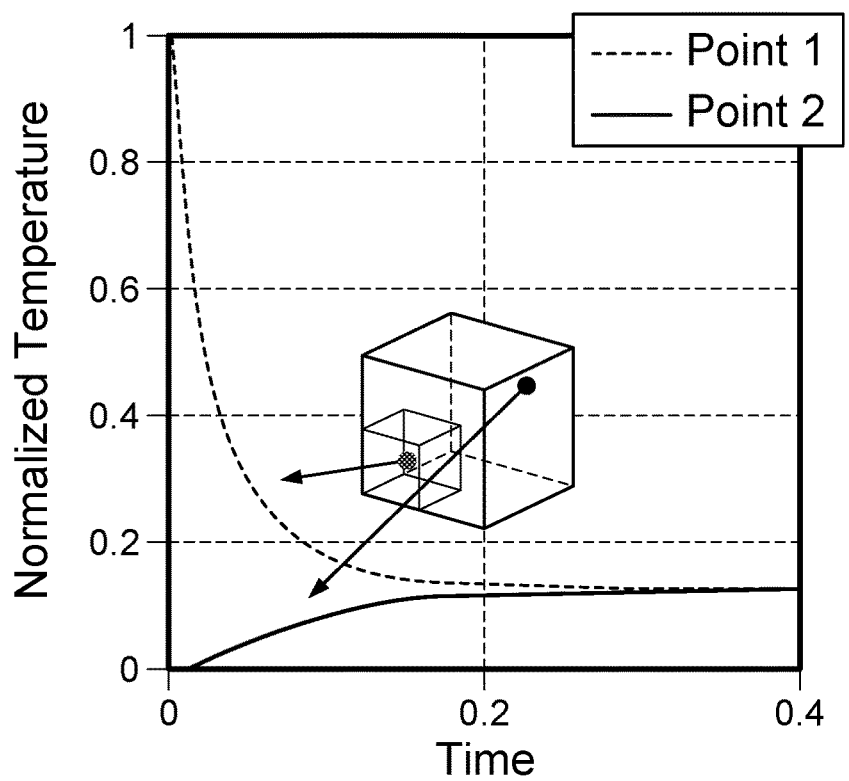
FIG. 6B shows a graph representing the analytical diffusion at observation point 1 and 2 of FIG. 6A.
Figure 7:
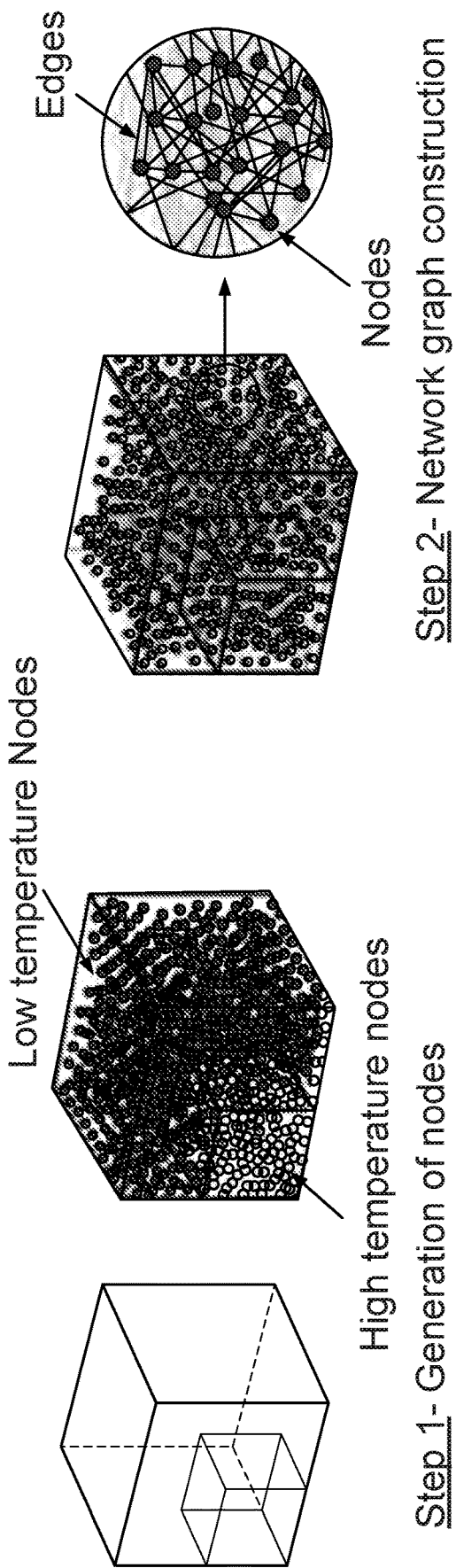
FIG. 7 depicts diagrams representing process steps towards error calculation and verification with the analytical method.

The steady state is the moment that observation points reach to an equal temperature up to fourth decimal point. The location of observation points inside the cube are as following: point 1 (0.25H, 0.25L, 0.25W) and point 2 (0.75H, 0.75L, 0.75W) which is shown in FIGS. 6A and 6B show the diffusion trend in the point 1 and 2 from the initial time step to steady state condition. FIG. 6A illustrates the cube with observation points: point 1: (0.25H, 0.25L, 0.25W) and point 2: (0.75H, 0.75L, 0.75W). FIG. 6B shows a graph representing the analytical diffusion at observation point 1 and 2 of FIG. 6A Graph Theory Modeling Approach To compare the accuracy of the graph theory approach with the analytical method, we divided the GT process into the following steps which are depicted graphically in FIG. 7.

Step 1) Convert the object into a set of discrete nodes (e.g., step 302 of FIG. 3).

Step 2) Construct a network graph from the nodes (e.g., step 304 of FIG. 3).

Step 3) Heat diffusion to steady state condition (e.g., steps 306-310 of FIG. 3).

Step 1: Generation of Nodes.

The whole part is transformed into a set of 91,000 discrete nodes. We randomly sampled four different number of nodes from these 91,000 nodes as shown in Table 1 (below). Since the heated volume is one-eighth of the total volume of the cube, we ensure that the number of nodes in the subsection is exactly one-eighth of the total nodes. Each node takes the character of its location, i.e. the nodes which are in the heated subsection take the high-temperature value (equal to 1, which is the highest in normalized temperature range) and the nodes that are outside the heated subsection remain with the low-temperature value (equal to 0, which is the lowest in normalized temperature range) at the initial time step.

Step 2: Network Graph Construction

In this step, the selected nodes are used to construct a network graph based on their spatial coordinates and neighborhood distance (ε) which is stored in the adjacency matrix as described above in reference to step 304 of FIG. 3. Based on the total number of selected nodes and analytical diffusion time, a specific neighboring distance ($\varepsilon$) is required to set the neighboring area for each node. Each node is connected to approximately 20, 80, 300 and 600 neighboring nodes in case 1, 2, 3 and 4, respectively. Selecting a higher number of nodes requires a larger adjacency matrix size and longer computational time. The computational time corresponds to converting the part to set of discrete nodes and building adjacency matrix which in this work is implemented on a desktop computer with an Intel® Core™ i7-6700 CPU @3.40 GHz, 32 GB RAM. Table 1 (below) shows the neighboring distance, adjacency matrix size and graph construction computational time in different experiment.

Step-3: Heat Diffusion to Steady State

Figure 8A:
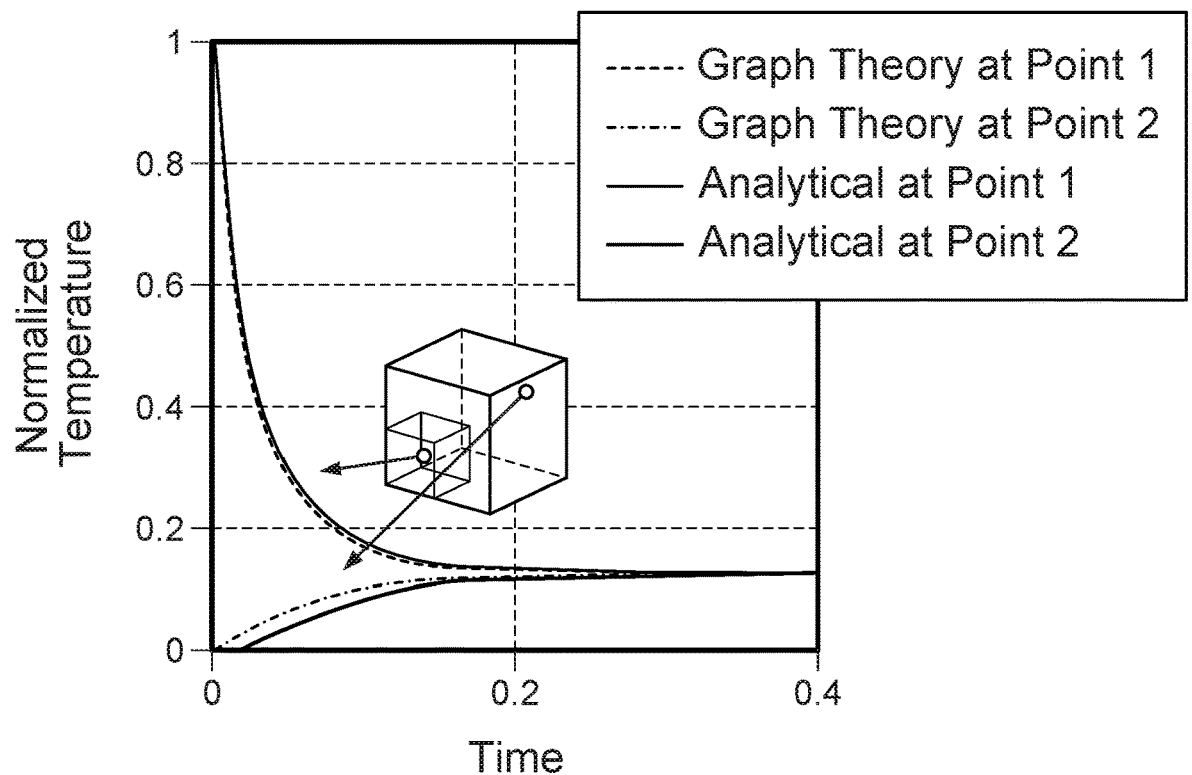
FIG. 8A shows a graph comparing of the heat diffusion trend between graph theory and analytical method (experiment 2 with 800 selected nodes).
Figure 8B:
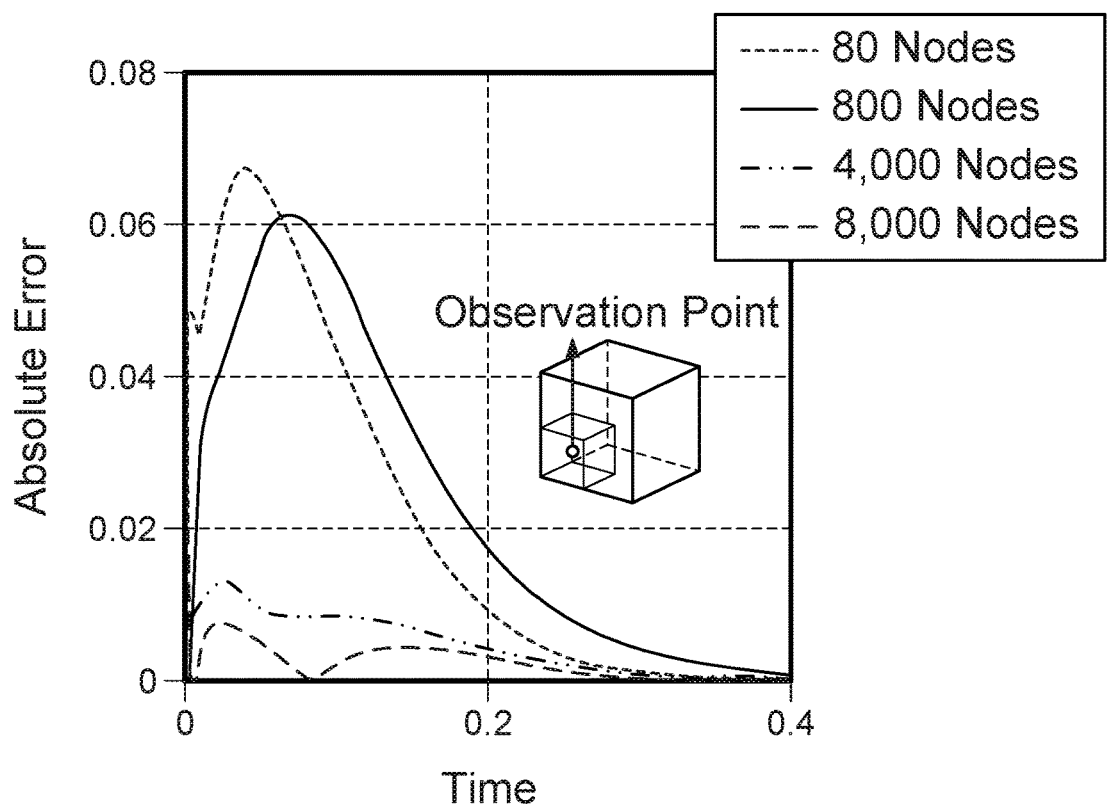
FIG. 8B shows a graph representing the absolute error comparison for different amount of nodes at observation point 1.

The heated nodes diffuse the heat through the graph network until it reaches a steady state condition. We consider two observation points, Point 1 at (0.25, 0.25, 0.25) and Point 2 at (0.75, 0.75, 0.75). The steady state condition is achieved when both observations have the equal temperature up to the fourth decimal point; thermal diffusivity (α), which corresponds the material properties in the graph theory method was considered equal to 1 (m²/s). FIG. 8A compares the trend of heat diffusion computed using graph theory for case 2 with the analytical solution. The symmetric mean absolute percent error (SMAPE) is used to quantify the error. FIG. 8B shows the trends of the absolute errors for four different cases. Although, increasing the number of nodes reduce the error of the method, it leads to longer computational time. Table 1 (below) delineates the SMAPE and total computational time of the process based on the different amount of nodes, from which it is evident even with the sparsest node condition (80 nodes in a cube of 1 mm×1 mm×1 mm), the error is less than 10%.

$$SMAPE = \frac{100\%}{n}\sum_{t=1}^{n} \text{Absolute Error} \quad (15)$$

$$\text{Absolute Error} = \frac{|\text{Analytical} - \text{Graph } Throry|}{(\text{Analytical} + \text{Graph Theory})}$$

TABLE 1

Details of Graph Theory Heat Diffusion Experiment in a Cube

| Case | Neighbourhood distance (ε) (mm) | Total number of selected nodes | Number of nodes at heated volume | Number of nodes outside of the heated volume | Network graph construction time (seconds) | Total graph theory solution computational time (seconds) | SMAPE |
|---|---|---|---|---|---|---|---|
| 1 | 0.55 | 80 | 10 | 70 | 0.94 | 0.97 | 10% |
| 2 | 0.37 | 800 | 100 | 700 | 1.41 | 1.55 | 7% |
| 3 | 0.31 | 4,000 | 500 | 3,500 | 20.78 | 38.14 | 5% |
| 4 | 0.28 | 8,000 | 1,000 | 7,000 | 163.33 | 236.64 | 3% |

Comparison with Finite Element Method

Figure 9:
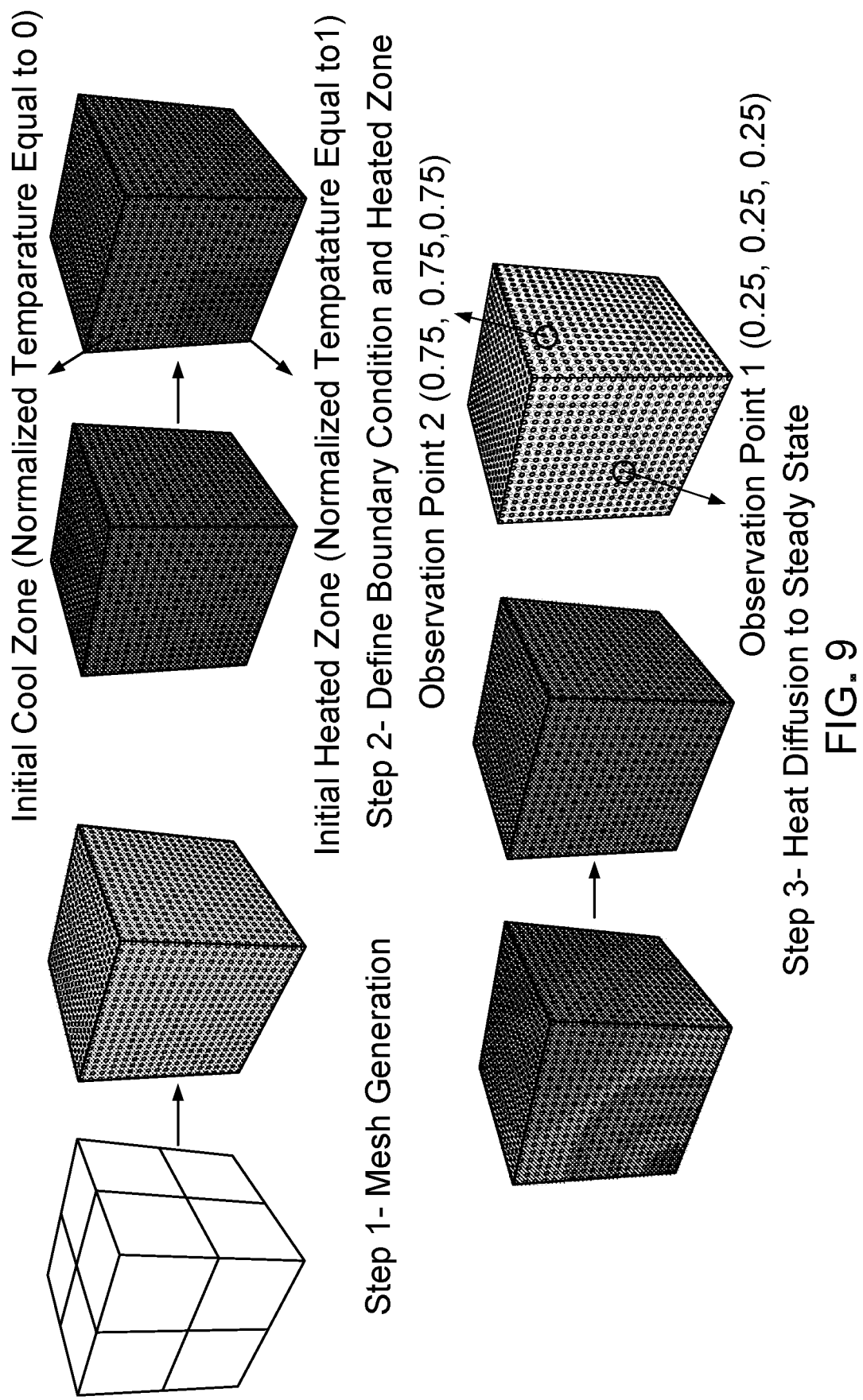
FIG. 9 depicts diagrams representing FEA process steps towards the error calculation and verification with the analytical method.
Figures 10A, 10B, 10C:
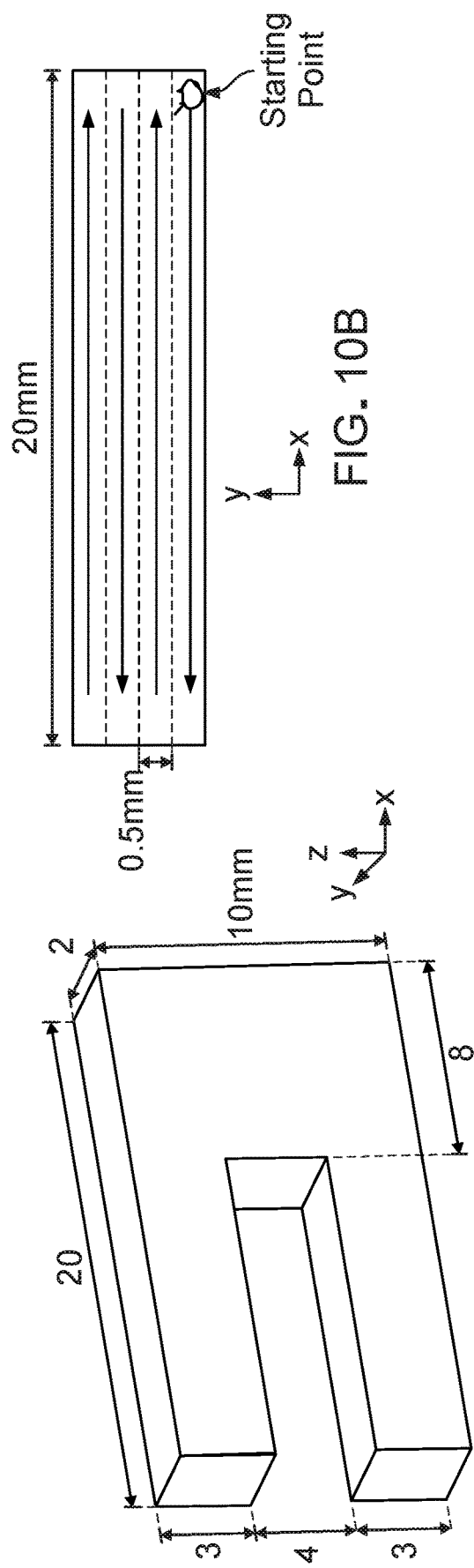
FIGS. 10A-10C various views of an example C-shaped object used in tests of the heat flux modeling processes described herein.

Continuing with our study of heat diffusion, the discussion below compares the graph theory and Finite Element Analysis (FEA) solutions. The FEA study is implemented in ABAQUS software. The FEA process is divided into the following steps which are depicted graphically in FIG. 9.

Step 1: Mesh generation.
Step 2: Define the boundary conditions and initial heated area.
Step 3: Heat diffusion to steady state.
Step 1: Mesh Generation in FEA.

On applying tetrahedral and regular grid (hexahedron) meshes on the cube, we found that, tetrahedral mesh performs better than regular grid mesh in terms of accuracy. We have used a linear tetrahedral mesh instead of a quadratic tetrahedron mesh, as the latter, has a higher generation time.
Step 2: Boundary Condition and Initial Heat Condition in FEA.

Identical boundary conditions as in case of the analytical method are applied herewith, i.e., the heat disperses through the part, and the cube is perfectly insulated. As on the analytical method, the material properties such as thermal conductivity, specific heat, and density of material in this method are considered to be equal to 1 unit.
Step 3: Heat Diffusion to Steady State in FEA.

The heated area diffuses its heat through the object until a steady state condition. The steady-state achieve when both observation points have the equal temperature up to the fourth decimal point. The SMAPE measure is used to quantify the error between FEA and analytical methods. Table 2 (below) reports a comparison between the total calculation time and number of nodes of FEA and graph theory with the same SMAPE values.

TABLE 2

Comparison of FEA and Graph Theory (GT) Method Based on the Total Computational Time and Accuracy

| | GT | | Tetrahedral FEA | | Regular Grid FEA | |
|---|---|---|---|---|---|---|
| SMAPE | Nodes | Time (seconds) | Nodes | Time (seconds) | Nodes | Time (seconds) |
| 10% | 80 | 1 | 1,200 | 190 | 9,000 | 380 |
| 7% | 800 | 2 | 12,000 | 660 | 158,500 | 9,000 |
| <5% | 8,000 | 237 | 76,000 | 3,540 | 1,000,000 | 43,000 |

Goldak et al. extended the pioneering work of Rosenthal's to predict the heat flux in welding process. See J. A. Goldak and M. Akhlaghi, "Computer Simulation of Welding Processes," *Computational Welding Mechanics*, pp. 16-69, 2005; and J. Goldak, A. Chakravarti, and M. Bibby, "A New Finite Element Model for Welding Heat Sources," *Metallurgical Transactions B*, vol. 15, pp. 299-305, 1984. Goldak et al. considered a 3D moving heat source model with an ellipsoidal, Gaussian density distribution as opposed to Rosenthal's ID moving point heat source. Goldak's model has been adapted for thermal modeling in additive manufacturing process, e.g., LPBF with the laser is considered a 3D Gaussian distributed moving heat source. We use Goldak's model in an FEA framework (Abaqus) with an element birth-and-death technique to simulate the LPBF process; the DFLUX subroutine in Abaqus is leveraged to model the characteristics of the laser. The Gaussian distributed laser heat source is defined as, $$Q(x, y, z) = \frac{PA}{2\pi\sigma^2}\exp\left[-\frac{d^2}{2\sigma^2}\right] \quad (17)$$

Where, Q is the volume heat power density (J/m³), P is the laser power (W), A is the absorptivity constant, ϕ is the standard deviation (ϕ=D/4 which D is the beam diameter in mm) and d (mm) is the radial distance of a point from the center of the beam. In this mode, conduction plays the main role in transferring the applied heat through the part and substrate. The simplest form of the transient heat conduction and convection equation is used in this study.

$$\rho C_p \frac{\partial T}{\partial t} - k\Delta T = Q(x, y, z) \quad (18)$$

$$q_{convection} = h(T_{amb} - T) \quad (19)$$

In the above, ρ is the density, $C_p$ is the specific heat of the material, T is the current temperature, t is time, k is the thermal conductivity, h is convective heat transfer coefficient thermal and $T_{amb}$ is the ambient temperature. A portion of the applied heat will be lost through the convection, radiation and surface evaporation which is not considered in this study.
Description of the Boundary Conditions The LPBF of a C-shape and pyramid part (e.g., as shown in FIGS. 10A-10F) are simulated on top of a build plate with the dimension of 100×20×10 mm. The titanium alloy powder material Ti-6Al-4V is considered for both the part and the build plate. FIGS. 10A-10F show the dimensions (FIGS. 10A and 10D), top-view and scanning strategy (FIGS. 10B and 10E), side-view (FIGS. 10C and 10F) used in the LPBF simulation. The hatches are defined along y-axis and layers along z-axis. The laser was simulated to move along x-axis and fuse hatches in each layer. Based on the width of each layer, the number of hatches remain constant in C-shape part, but vary in the pyramid, e.g., 20 hatches in the first layer, 18 hatches in second layer and finally only one hatch in layer number 20. Simulated hatch spacing and layer thickness are 0.5 and 0.2 mm for C-shape part and pyramid, respectively. We note that the layer thickness is purposely made exceedingly coarse to facilitate computation, and should ideally be termed as a super layer—each super layer consists of 20 individual layers of size 0.025 mm in C-shape and 8 in pyramid. The material properties and printing conditions are reported in Table 3 (below). The initial temperature is assumed to be the ambient temperature for the entire build, i.e., $T(x, y, z, \tau)_{\tau=0} = T_{amb.} = 25°$ C.

TABLE 3

Materials and Process Parameters for the FEA (ABAQUS) and NETTFAB simulation.

| | Values | |
|---|---|---|
| Parameters | C-Shape | Pyramid |
| Layer Thickness (mm) | 0.025 | 0.025 |
| Super-Layer Thickness (mm) | 0.5 | 0.2 |
| | (included 20 layers) | (included 8 layers) |
| Hatch thickness (mm) | 0.5 | 0.2 |
| Beam Diameter (mm) | 0.5 | 0.2 |
| Scanning Speed (mm/s) | 200 | |
| Thermal Conductivity (W/m-K) | 20 | |
| Density (kg/m$^3$) | 4,300 | |
| Specific Heat (J/kg-K) | 650 | |

Comparison of Heat Flux Results from Finite Element Analysis (ABAQUS) and a Commercial Software (NETFABB) with the Disclosed GT Process The C-shaped and pyramid part were simulated layer-by-layer using the proposed graph theoretic approach (as opposed to aggregating 20 layers in C-shape and 8 layers in pyramid into a so-called super layer). The parameters for the spectral graph theoretic approach were set as follows, based on offline tuning, $\alpha=15$; $\in=1.8$ mm; and 50 nodes are sampled per hatch which translates to 5 nodes per mm$^2$ in the C-shape part. These parameters for pyramid are; $\alpha=15$; $\in=0.25$ mm; and 40 nodes are sampled per hatch which translates to 50 nodes per mm$^2$. The heat distribution results from the last step (layer) of the FEA, Netfabb and graph theoretic simulations is juxtaposed pictorially in FIG. 14; the color bars represent normalized temperature between 0 and 1. From FIG. 14, it is evident that the temperature distribution captured by the graph theoretic approach closely resembles those derived from the FEA and Netfabb. The temperature at two locations on the bottom for the C-shape part and one location on the bottom for the pyramid were recorded over the complete simulation run, analogous to the presence of thermocouple sensors affixed to the part.

Figure 11A:
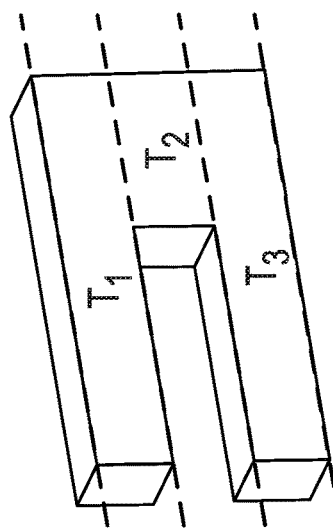
FIGS. 11A-11C depict time-step plots of the estimated heat flux in the C-shaped AM part of FIG. 2A as estimated using the process of the present disclosure and the finite element-based process at different locations on the AM part.
Figure 11C:
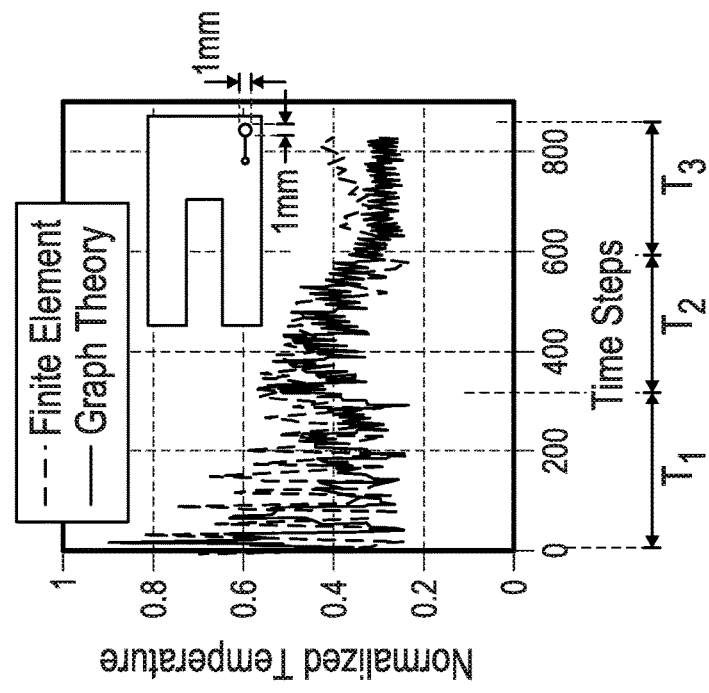
Figure 11B:
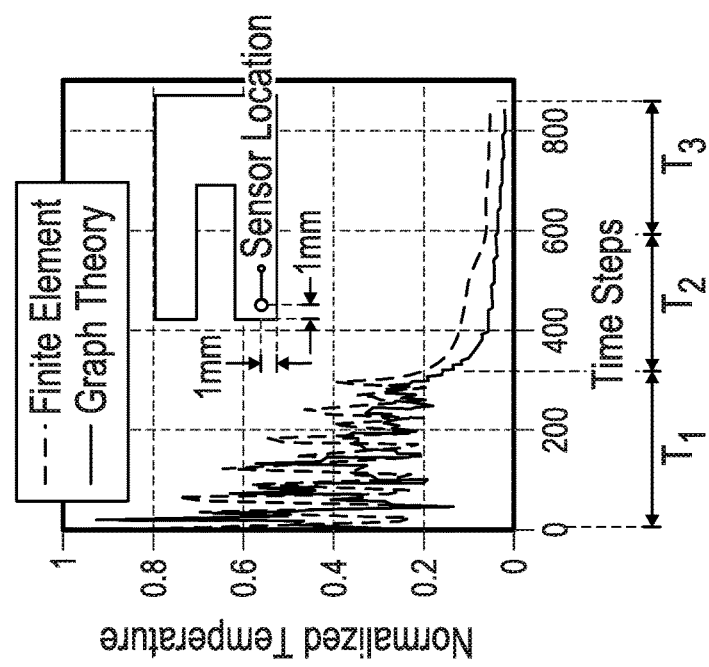
Figure 14:
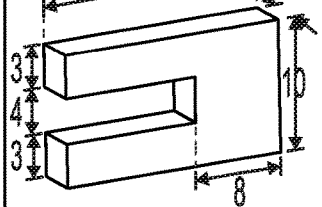
FIG. 14 depicts a Table (Table 4) which summarizes the experimental results comparing the heat flux modeling process of the present invention with other heat modeling processes.

FIG. 11A depicts the C-shape part divided into three sections T1, T2, and T3. FIGS. 11B and 11C depict plots of the heat flux trends observed at two locations on the C-shape part, in the left and right corner, respectively corresponding to the three part sections marked in FIG. 11A. The two C-shape measurement points (sensors) are at a distance of 1 mm from the left edge and 1 mm from the right edge of the part, respectively, as demarcated in the inset of FIGS. 11B and 11C, and are located 1 mm deep from the front edge of the part. Each time step along the x-axis of FIGS. 11B and 11C equate to 100 seconds of the process. We observe that the trends obtained from FIGS. 11B and 11C for both the FEA and graph-based methods are closely correlated. More pertinently, the simulation time of C-shape part for the FEA approach (ABAQUS) was close to 200 minutes on a dual core of Intel® Core™ i7-6700 CPU@3.40 GHz, 32 GB RAM while the computation time for the graph theoretic approach was less than 200 seconds on a desktop computer (MATLAB). Furthermore, the trends obtained are in accordance with those expected for parts with overhang features: the heat in overhang features is constrained in the C-shape part because of the lack of sufficient conductivity of the overhang surroundings. In FIG. 14 diagrams (b), (c) and (d), the overhang geometry is observed to have a higher magnitude of constrained heat. Similarly, the heat is diffused slower on the top layers of the pyramid due to less volume conductivity compare to the bottom layers. FIG. 14 diagrams (k), (m) and (n) show the heat distribution in the pyramid after the printing process is completed.

The temperature trends observed in the C-shape part is explained on partitioning the part geometry into three sections T1 through T3 as demarcated in FIG. 11A.

In FIG. 11B the spikes in section T1 correspond to the locations where the laser is directly (in the vertical direction) above the position of the measurement point (sensor). In section T2, the laser no longer passes over the location of the sensor leading to the observed precipitous drop. In section T3, given the impeded conductivity of the powder surrounding the overhang, the temperature does not increase, though the laser does pass directly over the sensor location.

In FIG. 11C, the spikes in section T1 correspond to the location where the laser passes over the sensor position. In part section T2, the increase in temperature can be attributed to two reasons: (a) in this section of the laser passes frequently and directly above the sensor location, and (b) the section is surrounded by a large volume of powder that hinders the flow of heat. Lastly, in section T3, the temperature begins to rise again due to the constrained heat flux in the overhang feature.

Figure 13A:
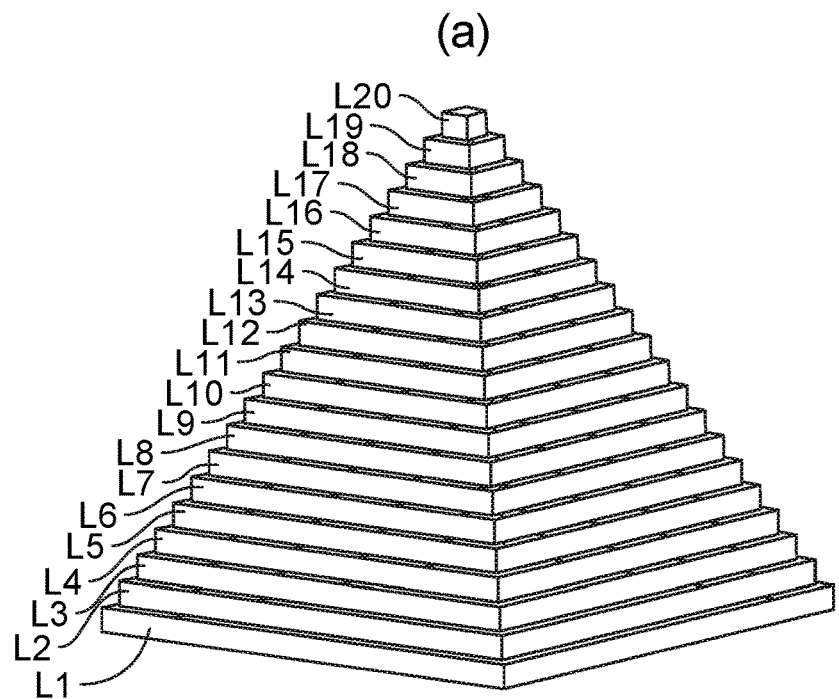
FIGS. 13A-13B depict time-step plots of the estimated heat flux in a pyramid-shaped AM part as estimated using the process of the present disclosure and the finite element-based process at different locations on the AM part.
Figure 13B:
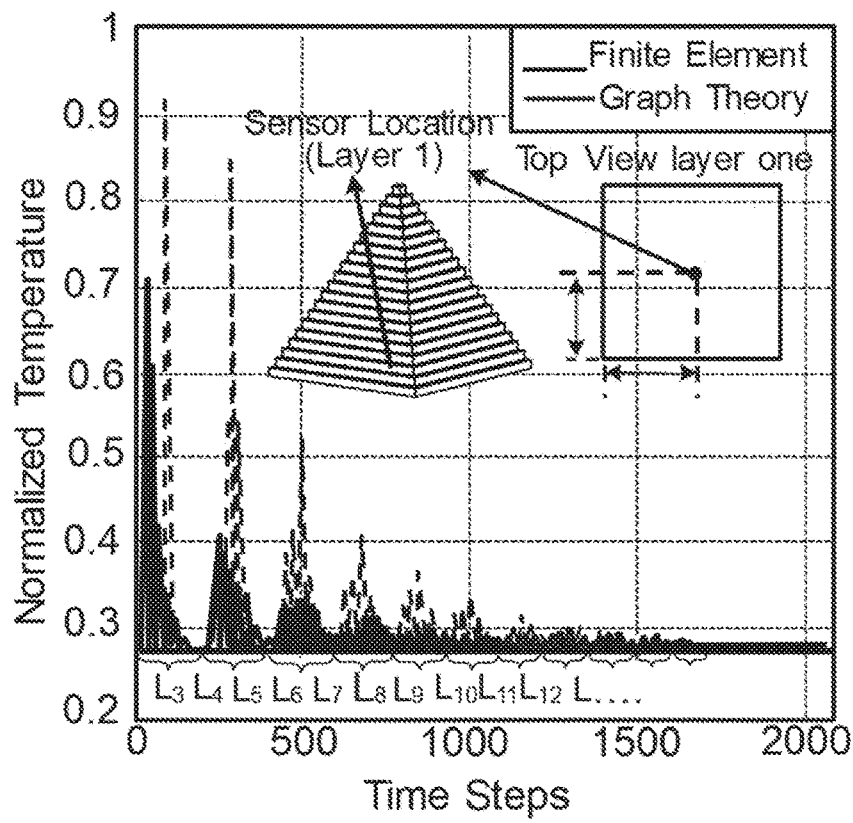

FIG. 13A shows the labeling of the all layers in the pyramid and FIG. 13B delineates the temperature history of the observation point through the printing of layer number 3 to layer number 20. Each spikes corresponds to its layer and It is obvious that the height of spikes is decreasing as we move to subsequent layers, due to smaller volume of the printing.

Effect of Part Design on the Heat Flux

Figure 12A:
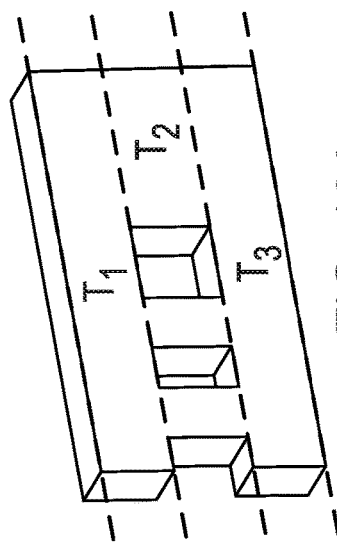
FIGS. 12A-12C depict time-step plots of the estimated heat flux in a modified C-shaped AM part as estimated using the process of the present disclosure and the finite element-based process at different locations on the AM part.

Based on the results from the C-shaped part (FIG. 14 diagrams (b), (c) and (d)), which showed that heat was constrained in the overhang section, it was hypothesized that designing supports (under the overhang) would provide a pathway for the heat to dissipate into the build plate. Accordingly, the C-shaped part was modified as shown in FIG. 12A. We note that the cross section of the support is designed with the same thickness as the rest of the part. The build process was simulated using the identical settings for the FEA and graph theoretic approach described above. The simulated heat flux trends are summarized below.

The heat flux on melting of the last layer with the FEA and graph theoretic approach are shown in FIG. 14 diagrams (f), (g) and (h), respectively. The trends therein affirm the hypothesis that placing supports with a thick cross section leads to dissipation of heat that is constrained within the overhang section.

Figure 12C:
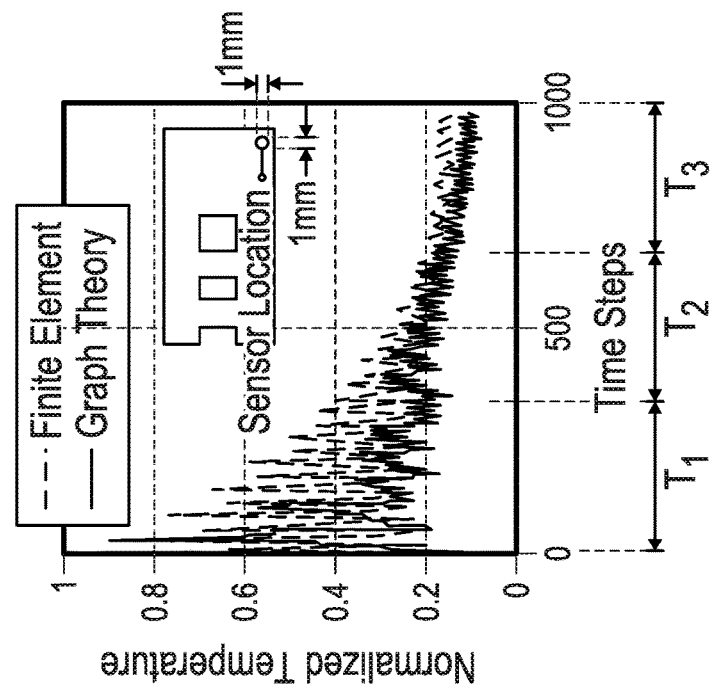
Figure 12B:
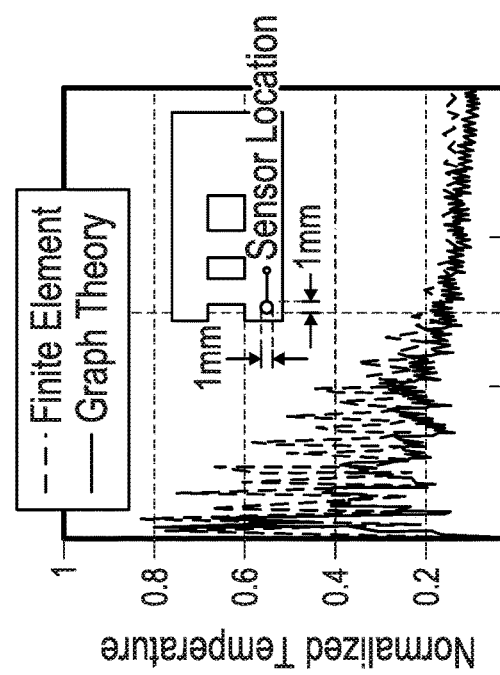

Likewise juxtaposing FIGS. 12B and 12C against, FIGS. 11B and 11C, respectively, it is evident that placing the supports under the overhang section diminishes the steep thermal gradients when transitioning from across the different sections of the part. As a consequence, the possibility of thermal stress-related deformation and cracking are potentially minimized.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor: and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 15:
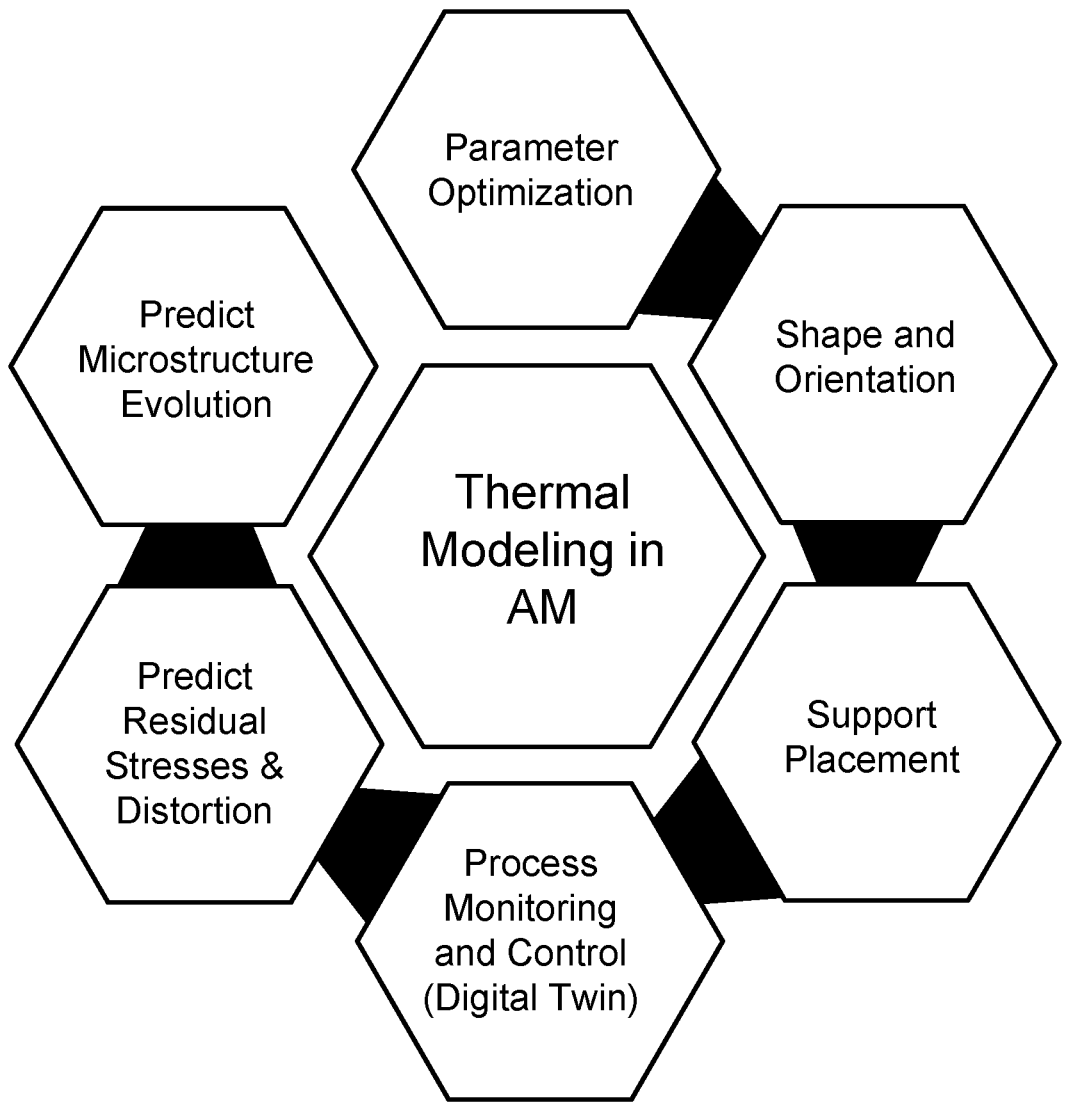
FIG. 15 depicts a diagram which summarizes various advantages of the heat flux modeling process of the present invention.

FIG. 15 depicts a diagram 1500 which summarizes various advantages and applications of the heat flux modeling process of the present invention.

Figure 16:
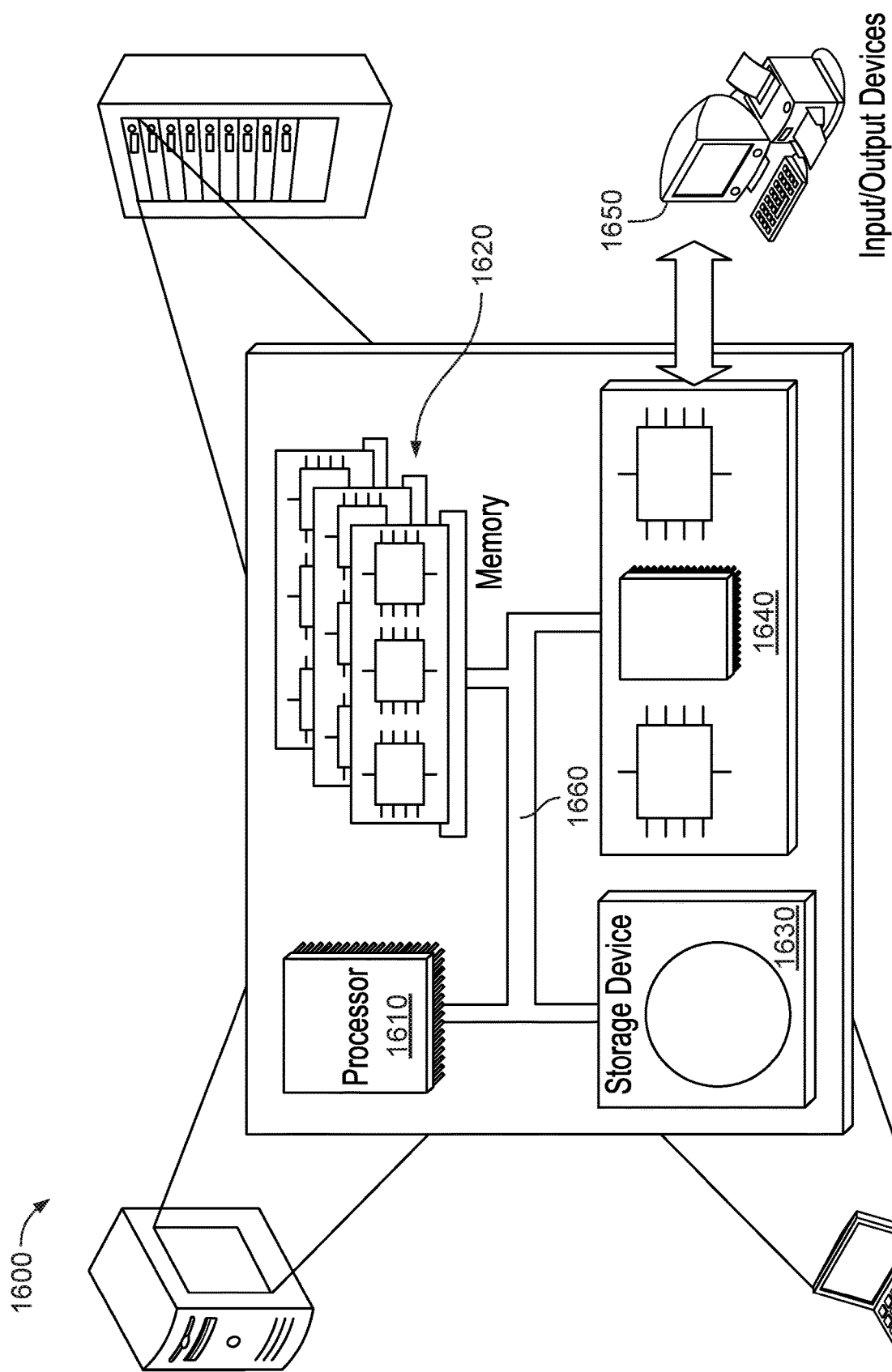
FIG. 16 depicts an example computing system, according to implementations of the present disclosure.

FIG. 16 depicts an example computing system, according to implementations of the present disclosure. The system 1600 may be used for any of the operations described with respect to the various implementations discussed herein. The system 1600 may include one or more processors 1610, a memory 1620, one or more storage devices 1630, and one or more input/output (I/O) devices 1650 controllable via one or more I/O interfaces 1640. The various components 1610, 1620, 1630, 1640, or 1650 may be interconnected via at least one system bus 1660, which may enable the transfer of data between the various modules and components of the system 1600.

The processor(s) 1610 may be configured to process instructions for execution within the system 1600. The processor(s) 1610 may include single-threaded processor(s), multi-threaded processor(s), or both. The processor(s) 1610 may be configured to process instructions stored in the memory 1620 or on the storage device(s) 1630. For example, the processor(s) 1610 may execute instructions for the various software module(s) described herein. The processor(s) 1610 may include hardware-based processor(s) each including one or more cores. The processor(s) 1610 may include general purpose processor(s), special purpose processor(s), or both.

The memory 1620 may store information within the system 1600. In some implementations, the memory 1620 includes one or more computer-readable media. The memory 1620 may include any number of volatile memory units, any number of non-volatile memory units, or both volatile and non-volatile memory units. The memory 1620 may include read-only memory, random access memory, or both. In some examples, the memory 1620 may be employed as active or physical memory by one or more executing software modules.

The storage device(s) 1630 may be configured to provide (e.g., persistent) mass storage for the system 1600. In some implementations, the storage device(s) 1630 may include one or more computer-readable media. For example, the storage device(s) 1630 may include a floppy disk device, a hard disk device, an optical disk device, or a tape device.

The storage device(s) 1630 may include read-only memory, random access memory, or both. The storage device(s) 1630 may include one or more of an internal hard drive, an external hard drive, or a removable drive.

One or both of the memory 1620 or the storage device(s) 1630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1600. In some implementations, the CRSM may include a data store that provides storage of computer-readable instructions or other information in a non-transitory format. The CRSM may be incorporated into the system 1600 or may be external with respect to the system 1600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices: magnetic disks such as internal hard disks and removable disks: magneto-optical disks: and CD-ROM and DVD-ROM disks. In some examples, the processor(s) 1610 and the memory 1620 may be supplemented by, or incorporated into, one or more application-specific integrated circuits (ASICs).

The system 1600 may include one or more I/O devices 1650. The I/O device(s) 1650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1650 may also include one or more output devices such as a display, LED(s), an audio output device (e.g., a speaker), a printer, a haptic output device, and so forth. The I/O device(s) 1650 may be physically incorporated in one or more computing devices of the system 1600, or may be external with respect to one or more computing devices of the system 1600.

The system 1600 may include one or more I/O interfaces 1640 to enable components or modules of the system 1600 to control, interface with, or otherwise communicate with the I/O device(s) 1650. The I/O interface(s) 1640 may enable information to be transferred in or out of the system 1600, or between components of the system 1600, through serial communication, parallel communication, or other types of communication. For example, the I/O interface(s) 1640 may comply with a version of the RS-232 standard for serial ports, or with a version of the IEEE 1284 standard for parallel ports. As another example, the I/O interface(s) 1640 may be configured to provide a connection over Universal Serial Bus (USB) or Ethernet. In some examples, the I/O interface(s) 1640 may be configured to provide a serial connection that is compliant with a version of the IEEE 1394 standard.

The I/O interface(s) 1640 may also include one or more network interfaces that enable communications between computing devices in the system 1600, or between the system 1600 and other network-connected computing systems. The network interface(s) may include one or more network interface controllers (NICs) or other types of transceiver devices configured to send and receive communications over one or more communication networks using any network protocol.

Computing devices of the system 1600 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to a suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks: and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well: for example, feedback provided to the user may be any appropriate form of sensory feedback, e.g., visual feedback, auditory feedback, or tactile feedback: and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method comprising:
   converting a model of an object into a three-dimensional node representation of the object, wherein the node representation includes one or more layers of nodes, and wherein each layer of the one or more layers of nodes corresponds to a layer of material to be added in an additive manufacturing process;
   generating, using distances between nodes of the node representation, an adjacency matrix of the object, wherein the adjacency matrix represents each of the one or more layers of nodes in the node representation;
   simulating an additive manufacturing process of the object, the simulating comprising, for each layer of the one or more layers of nodes represented in the adjacency matrix:
   applying a simulated heat to the layer of the adjacency matrix, and
   estimating, using the adjacency matrix, a diffusion of heat to other nodes based on the applied simulated heat; and
   generating a representation of an estimated heat distribution within the object.

2. The method of claim 1, wherein generating the adjacency matrix of the object comprises:
   defining layers of nodes by sorting nodes of the node representation based on respective z-coordinates of the nodes;
   defining hatches of nodes by sorting the nodes of the node representation based on respective y-coordinates of the nodes; and
   building the adjacency matrix based on relationships between the nodes.

3. The method of claim 1, wherein the representation of the estimated heat distribution within the object comprises a representation of heat flux within the object.

4. The method of claim 1, wherein the representation of the estimated heat distribution within the object comprises a representation of temperature distribution within the object.

5. The method of claim 1, further comprising approximating the heat in the object as a function of eigenvectors ($\phi$) and eigenvalues ($\Lambda$) of a Laplacian matrix derived from the adjacency matrix.

6. The method of claim 1, further comprising applying data representing the estimated heat distribution within the object as an input to a finite element analysis to obtain an estimate of physical distortions to the object caused by the heat distribution.

7. The method of claim 1, wherein converting the model of the object into the node representation of the object comprises generating the nodes of the node representation by randomly sampling spatial locations within the model.

8. The method of claim 1, wherein generating the adjacency matrix of the object comprises, for each node, determining pairwise distances between the node and neighboring nodes that within a neighbor distance, $\varepsilon$, of the node.

9. The method of claim 1, wherein generating the adjacency matrix of the object comprises determining a matrix weight, $a_{ij}$, for each pair of nodes that are within a neighbor distance, $\varepsilon$, of each other.

10. The method of claim 9, wherein each matrix weight, $a_{ij}$, is determined from:

$$a_{ij} = \begin{cases} e^{-\frac{(\pi_i - \pi_j)^2}{\sigma^2}}, & (\pi_i - \pi_j)^2 \le \varepsilon, \text{ where } (\pi_i - \pi_j)^2 \\ 0, & (\pi_i - \pi_j)^2 > \varepsilon \end{cases}$$

is the square of the distance between nodes $\pi_i$ and $\pi_j$ and $\sigma$ is the standard deviation of pairwise distances between nodes.

11. An additive manufacturing heat transfer simulation system comprising:
   at least one processor; and a data store coupled to the at least one processor having instructions stored thereon which, when executed by the at least one processor, causes the at least one processor to perform operations comprising:

converting a model of an object into a three-dimensional node representation of the object, wherein the node representation includes one or more layers of nodes, and wherein each layer of the one or more layers of nodes corresponds to a layer of material to be added in an additive manufacturing process;

generating, using distances between nodes of the node representation, an adjacency matrix of the object, wherein the adjacency matrix represents each of the one or more layers of nodes in the node representation;

simulating an additive manufacturing process of the object, the simulating comprising, for each layer of the one or more layers of nodes represented in the adjacency matrix:

applying a simulated heat to the layer of the adjacency matrix, and estimating, using the adjacency matrix, a diffusion of heat to other nodes based on the applied simulated heat; and generating a representation of an estimated heat distribution within the object.

12. The system of claim 11, wherein generating the adjacency matrix of the object comprises:

defining layers of nodes by sorting nodes of the node representation based on respective z-coordinates of the nodes;

defining hatches of nodes by sorting the nodes of the node representation based on respective y-coordinates of the nodes; and building the adjacency matrix based on relationships between the nodes.

13. The system of claim 11, wherein the representation of the estimated heat distribution within the object comprises a representation of heat flux within the object.

14. The system of claim 11, wherein the representation of the estimated heat distribution within the object comprises a representation of temperature distribution within the object.

15. The system of claim 11, wherein the operations further comprise approximating the heat in the object as a function of eigenvectors ($\phi$) and eigenvalues ($\Lambda$) of a Laplacian matrix derived from the adjacency matrix.

16. The system of claim 11, further comprising applying data representing the estimated heat distribution within the object as an input to a finite element analysis to obtain an estimate of physical distortions to the object caused by the heat distribution.

17. The system of claim 11, wherein converting the model of the object into the node representation of the object comprises generating the nodes of the node representation by randomly sampling spatial locations within the model.

18. The system of claim 11, wherein generating the adjacency matrix of the object comprises, for each node, determining pairwise distances between the node and neighboring nodes that within a neighbor distance, $\epsilon$, of the node.

19. The system of claim 11, wherein generating the adjacency matrix of the object comprises determining a matrix weight, $a_{ij}$, for each pair of nodes that are within a neighbor distance, $\epsilon$, of each other.

20. A non-transitory computer readable storage device storing instructions that, when executed by at least one processor, cause the at least one processor to perform operations comprising:

converting a model of an object into a three-dimensional node representation of the object, wherein the node representation includes one or more layers of nodes, and wherein each layer of the one or more layers of nodes corresponds to a layer of material to be added in an additive manufacturing process;

generating, using distances between nodes of the node representation, an adjacency matrix of the object, wherein the adjacency matrix represents each of the one or more layers of nodes in the node representation;

simulating an additive manufacturing process of the object, the simulating comprising, for each layer of the one or more layers of nodes represented in the adjacency matrix:

applying a simulated heat to the layer of the adjacency matrix, and estimating, using the adjacency matrix, a diffusion of heat to other nodes based on the applied simulated heat; and generating a representation of an estimated heat distribution within the object.

* * * * *